(12) United States Patent
Masserant

(10) Patent No.: US 12,385,199 B2
(45) Date of Patent: Aug. 12, 2025

(54) CONCRETE BASED COMPOSITE MATERIAL AND METHOD OF MAKING A STRUCTURAL ELEMENT THEREFROM

(71) Applicant: Mid-American Gunite, Inc., Newport, MI (US)

(72) Inventor: Keith P. Masserant, Newport, MI (US)

(73) Assignee: Mid-American Gunite, Inc., Newport, MI (US)

( * ) Notice: Subject to any disclaimer, the term of this patent is extended or adjusted under 35 U.S.C. 154(b) by 688 days.

(21) Appl. No.: 17/641,743

(22) PCT Filed: Sep. 9, 2020

(86) PCT No.: PCT/US2020/049915
§ 371 (c)(1),
(2) Date: Mar. 9, 2022

(87) PCT Pub. No.: WO2021/050528
PCT Pub. Date: Mar. 18, 2021

(65) Prior Publication Data
US 2022/0332641 A1    Oct. 20, 2022

Related U.S. Application Data

(60) Provisional application No. 62/898,771, filed on Sep. 11, 2019, provisional application No. 62/898,769, filed on Sep. 11, 2019.

(51) Int. Cl.
| | | |
|---|---|---|
| *E01F 15/08* | (2006.01) | |
| *C04B 7/147* | (2006.01) | |
| *C04B 14/48* | (2006.01) | |
| *C04B 16/06* | (2006.01) | |
| *C04B 18/06* | (2006.01) | |
| *C04B 41/48* | (2006.01) | |
| *E01F 13/02* | (2006.01) | |

(52) U.S. Cl.
CPC .......... *E01F 15/083* (2013.01); *C04B 7/147* (2013.01); *C04B 14/48* (2013.01); *C04B 16/0633* (2013.01); *C04B 18/067* (2013.01); *C04B 41/4884* (2013.01); *E01F 13/02* (2013.01); *E01F 13/022* (2013.01); *E01F 15/086* (2013.01); *C04B 2201/52* (2013.01)

(58) Field of Classification Search
CPC ..... C04B 7/147; C04B 14/48; C04B 16/0633; C04B 18/067; C04B 41/4884; C04B 2201/52; E01F 15/083; E01F 13/02; E01F 13/022; E01F 15/086; E01F 15/146; E01F 13/12; E02B 3/129
See application file for complete search history.

(56) References Cited

U.S. PATENT DOCUMENTS

| | | |
|---|---|---|
| 5,484,236 A | 1/1996 | Gravier |
| 5,865,000 A | 2/1999 | Nemegeer et al. |
| 2006/0078729 A1 | 4/2006 | Yabuki et al. |
| 2010/0326336 A1 | 12/2010 | Struthers et al. |
| 2012/0137933 A1 | 6/2012 | Koh et al. |
| 2017/0073270 A1 | 3/2017 | Shao et al. |

FOREIGN PATENT DOCUMENTS

| | | | | |
|---|---|---|---|---|
| CN | 102219447 A | * | 10/2011 | ............. C04B 28/02 |
| CN | 107698220 A | * | 2/2018 | ............. C04B 28/06 |
| CN | 109748556 A | * | 5/2019 | ............. C04B 28/04 |
| JP | 63-239140 A | * | 10/1988 | ............. C04B 28/04 |
| JP | 11-12014 A | * | 1/1999 | ............. C04B 28/02 |

OTHER PUBLICATIONS

International Search report for International application No. PCT/US 20/49915, dated Dec. 10, 2020.
Corinaldesi et al., "Mechanical And Physical Properties Of Cement Mortars Containing 8-10 Plastic Waste Particles", 2nd International Conference on Sustainable Construction Materials and Technologies, 2010, p. 1-10.

* cited by examiner

*Primary Examiner* — Anthony J Green
(74) *Attorney, Agent, or Firm* — Quinn 1P Law

(57) ABSTRACT

A concrete-based composite material including iron rich particles is characterized by an iron content greater than 17% by weight of the composite material, can include iron particles which are an iron by-product recovered from iron slag material, can include iron rich particles which have an iron content of at least 60% by weight of the iron rich particles, and/or can include iron particles having a particle size distribution in the range of about −⅜ inch to +60 mesh or in the range of about −20 mesh to about +60 mesh. The composite material can include ground granulated blast furnace slag as a portion of the cementitious component of the composite material. A method of forming a structural element from the composite material includes casting the structural element such that the structural element is characterized by a ballistic performance of Level 10 as defined by Underwriters Laboratories standard UL752.

18 Claims, 27 Drawing Sheets

Table I

| Batch Composition / Mixture Identification | A1 | A2 | A3 | B1 | B2 | B3 | B4 | B5 | B6 | B7 |
|---|---|---|---|---|---|---|---|---|---|---|
| Cementitious Component (Lbs./CuYd.) | | | | | | | | | | |
| Portland Cement - Type 1, St. Mary's | 650 | 650 | 650 | 395 | 395 | 395 | 395 | 395 | 397 | 397 |
| Ground Granulated Blast Furnace Slag (GGBFS) | - | - | - | 263 | 263 | 263 | 263 | 263 | 45 | 45 |
| GGBFS % wt. of Cement | 0.0% | 0.0% | 0.0% | 40.0% | 40.0% | 40.0% | 40.0% | 40.0% | 10.2% | 10.2% |
| Sand Component (Lbs./CuYd.) | | | | | | | | | | |
| Fine Aggregate - 2NS Sand | - | 625 | - | 712 | 633 | 712 | 640 | 356 | 676 | 633 |
| Iron Particles - Type I (IP-I) | 800 | 950 | - | 1,410 | 1,255 | - | - | 940 | 1,339 | 1,255 |
| Iron Particles - Type II (IP-II) | - | - | - | - | - | - | - | - | - | - |
| Iron Particles - Type III (IP-III) | - | - | 2,530 | - | - | 2,014 | 1,812 | 1,343 | - | - |
| Iron Particles - Types I, II, III (% wt. of Sand Component) | 100.0% | 60.3% | 100.0% | 66.4% | 66.5% | 73.9% | 73.9% | 86.5% | 66.5% | 66.5% |
| Iron Particles - Types I, II, III (% wt. of Cementitious Com.) | 123.1% | 146.2% | 389.2% | 214.3% | 190.7% | 306.1% | 275.4% | 347.0% | 302.9% | 283.9% |
| Iron Particles - Types I, II, III (% wt. of Total Mixture) | 25.6% | 31.9% | 64.2% | 32.1% | 29.1% | 40.2% | 37.1% | 46.5% | 32.3% | 30.6% |
| Iron (Fe) Content of Mixture (% of Mixture by Weight) | | | | | | | | | | |
| Range - Low (% Weight of Total Mixture) | 15.3% | 19.1% | 55.8% | 19.3% | 17.4% | 26.1% | 24.1% | 29.3% | 19.4% | 18.4% |
| Range - High (% Weight of Total Mixture) | 20.5% | 25.5% | 59.0% | 25.7% | 23.3% | 26.1% | 24.1% | 33.1% | 25.8% | 24.5% |
| Average Iron (Fe) % Weight of Total Mixture | 17.9% | 22.3% | 57.4% | 22.5% | 20.4% | 26.1% | 24.1% | 31.2% | 22.6% | 21.4% |
| Aggregate Component (Lbs./CuYd.) | | | | | | | | | | |
| Coarse - 6AAA Crushed Limestone | 1,425 | 500 | 500 | 1,318 | 1,472 | 1,318 | 1,472 | 1,318 | 659 | - |
| Coarse - Riverstone | - | - | - | - | - | - | - | - | - | - |
| Peastone | - | - | - | - | - | - | - | - | 735 | 1,472 |
| Fiber Additives (Lbs./CuYd.) | | | | | | | | | | |
| Steel Fibers | 7 | 7 | 7 | - | - | - | - | - | - | - |
| Polypropylene Fibers | - | - | - | 1.5 | 1.5 | 1.5 | 1.5 | 1.5 | 1.5 | 1.5 |
| Water Component (Lbs./CuYd.) | | | | | | | | | | |
| Water Batched and Added | 247 | 247 | 256 | 290 | 296 | 311 | 304 | 291 | 299 | 296 |
| Admixture (oz./cwt of Cement) | | | | | | | | | | |
| Admix - Lignosulfonate Based (AM1) | - | - | - | 3 | 3 | 3 | 3 | 3 | 3 | 3 |
| Admix - Polycarboxylate Based (AM2) | 6 | 6 | 24 | - | - | - | - | - | - | - |
| Admix - Non-Chloride Water Reducer (AM3) | 3 | 3 | 3 | - | - | - | - | - | - | - |
| Admix - Alpha-Olefin Air Entrainer (AM4) | 3 | 1 | 2 | - | - | - | - | - | - | - |

Fig-1

Table I (Continued)

| Batch Composition / Mixture Identification 20 → | A1 | A2 | A3 | B1 | B2 | B3 | B4 | B5 | B6 | B7 |
|---|---|---|---|---|---|---|---|---|---|---|
| 12 → Cementitious Component (Parts by Weight on Basis of 100 Parts by Weight Cementitious Component) | | | | | | | | | | |
| Portland Cement - Type 1, St. Mary's | 100 | 100 | 100 | 60 | 60 | 60 | 60 | 60 | 90 | 90 |
| Ground Granulated Blast Furnace Slag (GGBFS) | - | - | - | 40 | 40 | 40 | 40 | 40 | 10 | 10 |
| GGBFS % wt. of Cement | 0% | 0% | 0% | 40% | 40% | 40% | 40.0% | 40% | 10% | 10% |
| 14 → Sand Component (Parts by Weight on Basis of 100 Parts by Weight Cementitious Component) | | | | | | | | | | |
| Fine Aggregate - 2NS Sand | 0 | 96 | 0 | 108 | 96 | 108 | 97 | 54 | 153 | 143 |
| 30 { 26 { Iron Particles - Type I (IP-I) | 123 | 1465 | 0 | 214 | 191 | 0 | 0 | 143 | 303 | 284 |
| Iron Particles - Type II (IP-II) | 0 | 0 | 389 | 0 | 0 | 0 | 0 | 0 | 0 | 0 |
| 28 → Iron Particles - Type III (IP-III) | 0 | 0 | 0 | 0 | 0 | 306 | 275 | 204 | 0 | 0 |
| Iron Particles - Types I, II, III (% wt. of Sand Component) | 100.0% | 60.3% | 100.0% | 66.4% | 66.5% | 73.9% | 73.9% | 86.5% | 66.5% | 66.5% |
| Iron Particles - Types I, II, III (% wt. of Cementitious Com.) | 123.1% | 146.2% | 389.2% | 214.3% | 190.7% | 306.1% | 275.4% | 347.0% | 302.9% | 283.9% |
| Iron Particles - Types I, II, III (% wt. of Total Mixture) | 25.6% | 31.9% | 64.2% | 32.1% | 29.1% | 40.2% | 37.1% | 46.5% | 32.3% | 30.6% |
| Iron (Fe) Content of Mixture (% of Mixture by Weight) | | | | | | | | | | |
| Range - Low (% Weight of Total Mixture) | 15.3% | 19.1% | 55.8% | 19.3% | 17.4% | 26.1% | 24.1% | 29.3% | 19.4% | 18.4% |
| Range - High (% Weight of Total Mixture) | 20.5% | 25.5% | 59.0% | 25.7% | 23.3% | 26.1% | 24.1% | 33.1% | 25.8% | 24.5% |
| Average Iron (Fe) % Weight of Total Mixture | 17.9% | 22.3% | 57.4% | 22.5% | 20.4% | 26.1% | 24.1% | 31.2% | 22.6% | 21.4% |
| 16 → Aggregate Component (Parts by Weight on Basis of 100 Parts by Weight Cementitious Component) | | | | | | | | | | |
| Coarse - 6AAA Crushed Limestone | 219 | 77 | 77 | 200 | 224 | 200 | 224 | 200 | 149 | 0 |
| Coarse - Riverstone | 0 | 0 | 0 | 0 | 0 | 0 | 0 | 0 | 0 | 333 |
| Peastone | 0 | 0 | 0 | 0 | 0 | 0 | 0 | 0 | 166 | 0 |
| 18 → Fiber Additives (Parts by Weight on Basis of 100 Parts by Weight Cementitious Component) | | | | | | | | | | |
| Steel Fibers | 1.08 | 1.08 | 1.08 | 0.23 | 0.23 | 0.23 | 0.23 | 0.23 | 0.34 | 0.34 |
| Polypropylene Fibers | | | | | | | | | | |
| 22 → Water Component (Parts by Weight on Basis of 100 Parts by Weight Cementitious Component) | | | | | | | | | | |
| Water Batched and Added | 38 | 38 | 39 | 44 | 45 | 47 | 46 | 44 | 68 | 67 |
| 24 → Admixture (oz./cwt of Cement) | | | | | | | | | | |
| Admix - Lignosulfonate Based (AM1) | - | - | - | 3 | 3 | 3 | 3 | 3 | 3 | 3 |
| Admix - Polycarboxylate Based (AM2) | 6 | 8 | 24 | - | - | - | - | - | - | - |
| Admix - Non-Chloride Water Reducer (AM3) | 3 | 3 | 3 | - | - | - | - | - | - | - |
| Admix - Alpha-Olefin Air Entrainer (AM4) | 3 | 1 | 2 | - | - | - | - | - | - | - |

Fig-1A

Table I (Continued)

| Batch Composition / Mixture Identification 20→ | A1 | A2 | A3 | B1 | B2 | B3 | B4 | B5 | B6 | B7 |
|---|---|---|---|---|---|---|---|---|---|---|
| Iron Particles Content of Mixture (% by Weight) | 25.6% | 31.9% | 64.2% | 32.1% | 29.1% | 40.2% | 37.1% | 46.5% | 32.3% | 30.6% |
| Iron Particles (Types I, II, III) as %wt. of Mixture | 69.8% | 70.0% | 89.5% | 70.0% | 70.0% | 65.0% | 65.0% | 67.1% | 70.0% | 70.0% |
| Iron (Fe) Content (% by Weight) | 17.9% | 22.3% | 57.4% | 22.5% | 20.4% | 26.1% | 24.1% | 31.2% | 22.6% | 21.4% |
| Field Information | | | | | | | | | | |
| Slump (Inches) | n/a | 8.0 | 6.0 | 1.5 | 4.3 | 5.3 | 4.8 | 6.8 | 8.0 | 3.0 |
| Unit Weight (lbs/cu.ft) | n/a | 169.6 | 198.4 | 175.9 | 167.6 | 163.6 | 166.4 | 177.9 | 172.0 | 173.5 |
| Compressive Strength (psi) - ASTM C39 | | | | | | | | | | |
| 7 Day (Average of Samples Tested) | 8,690 | 10,150 | 9,310 | 6,850 | 5,980 | 2,600 | 3,000 | 3,680 | 4,780 | 5,850 |
| Break Type - 7 Day | 1 | 2 | 4 | 4,5 | 5 | 5 | 5 | 5 | 4 | 5 |
| 28 Day (Average of Samples Tested) | 9,940 | 11,965 | 10,405 | 9,800 | 8,290 | 3,925 | 4,145 | 5,330 | 7,965 | 8,190 |
| Break Type - 7 Day | 3 | 3 | 5,6 | 5 | 5 | 5 | 5 | 5 | 3, 4 | 5 |
| Ballistic Test Results 32→ | | | | | | | | | | |
| 3.5" Thick Block | | | | | | | | | | |
| Penetration Depth - 1st Shot (in.) | | | <1.0* | | >3.5 | | | | | |
| 4" Thick Block | | | | | | | | | | |
| Penetration Depth - 1st Shot (in.) Block 1 | | | <1.0* | | | | | | | |
| Penetration Depth - 1st Shot (in.) Block 2 | | | <1.0 | | | | | | | |
| Penetration Depth - 1st Shot (in.) Block 3 | | | <1.0* | | | | | | | |
| 9.25" Thick Block | | | | | | | | | | |
| Penetration Depth - 1st Shot (in.) | | | | 2.5 | 2.5 | 3.75 | | | | |
| Penetration Depth - 3rd Shot (in.) | | | | 4.0 | 4.5 | 5.5 | | | | |
| 12" Thick Block | | | | | | | | | | |
| Penetration Depth - 1st Shot (in.) Target 1 | | | n/a** | | | | | | | |
| Penetration Depth - 1st Shot (in.) Target 1 | | | n/a** | | | | | | | |
| Penetration Depth - 1st Shot (in.) Target 2 | | | n/a** | | | | | | | |

*Penetration Estimated; Block Fractured from Percussive Stress After Impact
**Penetration Depth Not Measured at Time of Test; see FIGS. 18 - 31

Fig-2

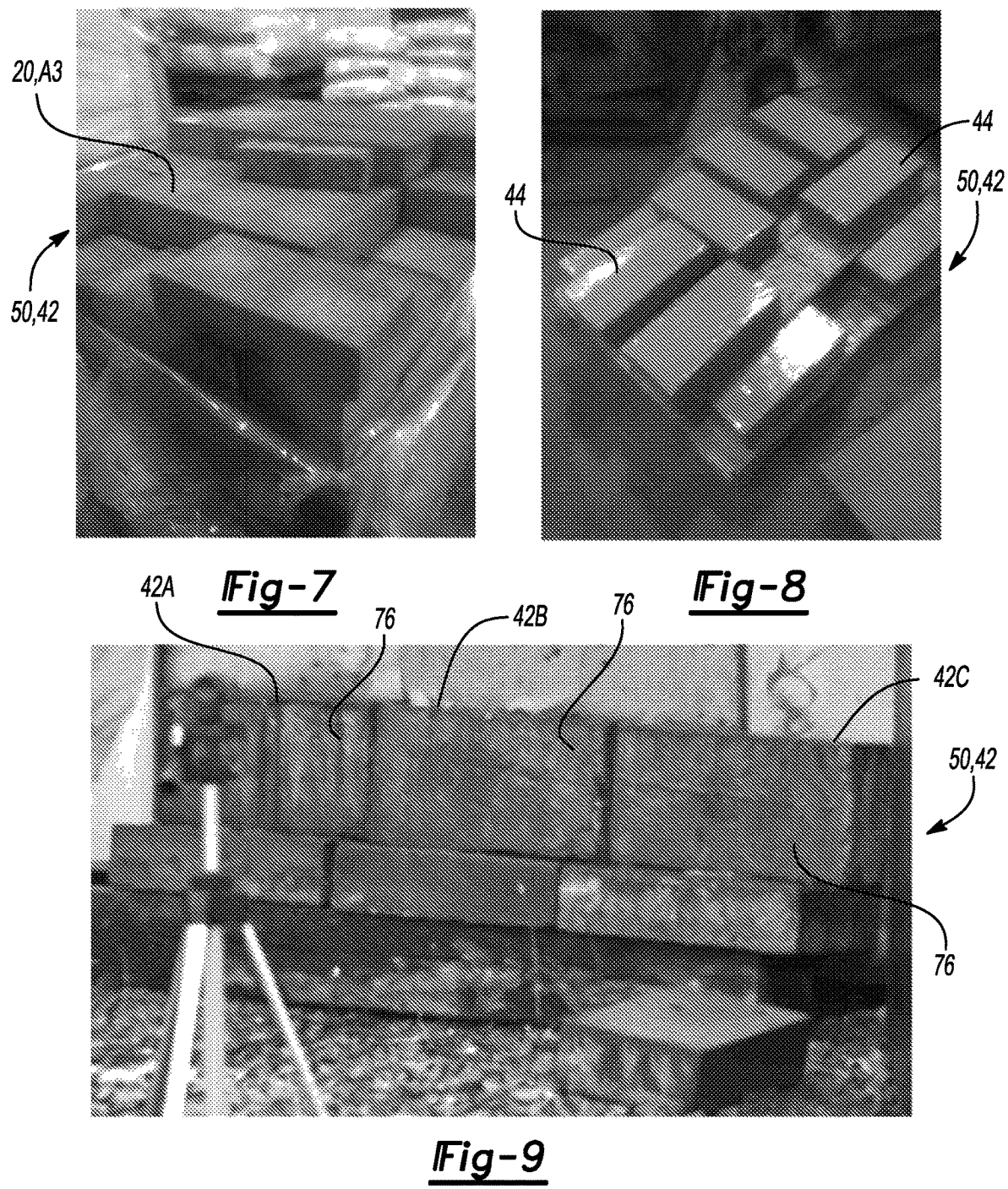

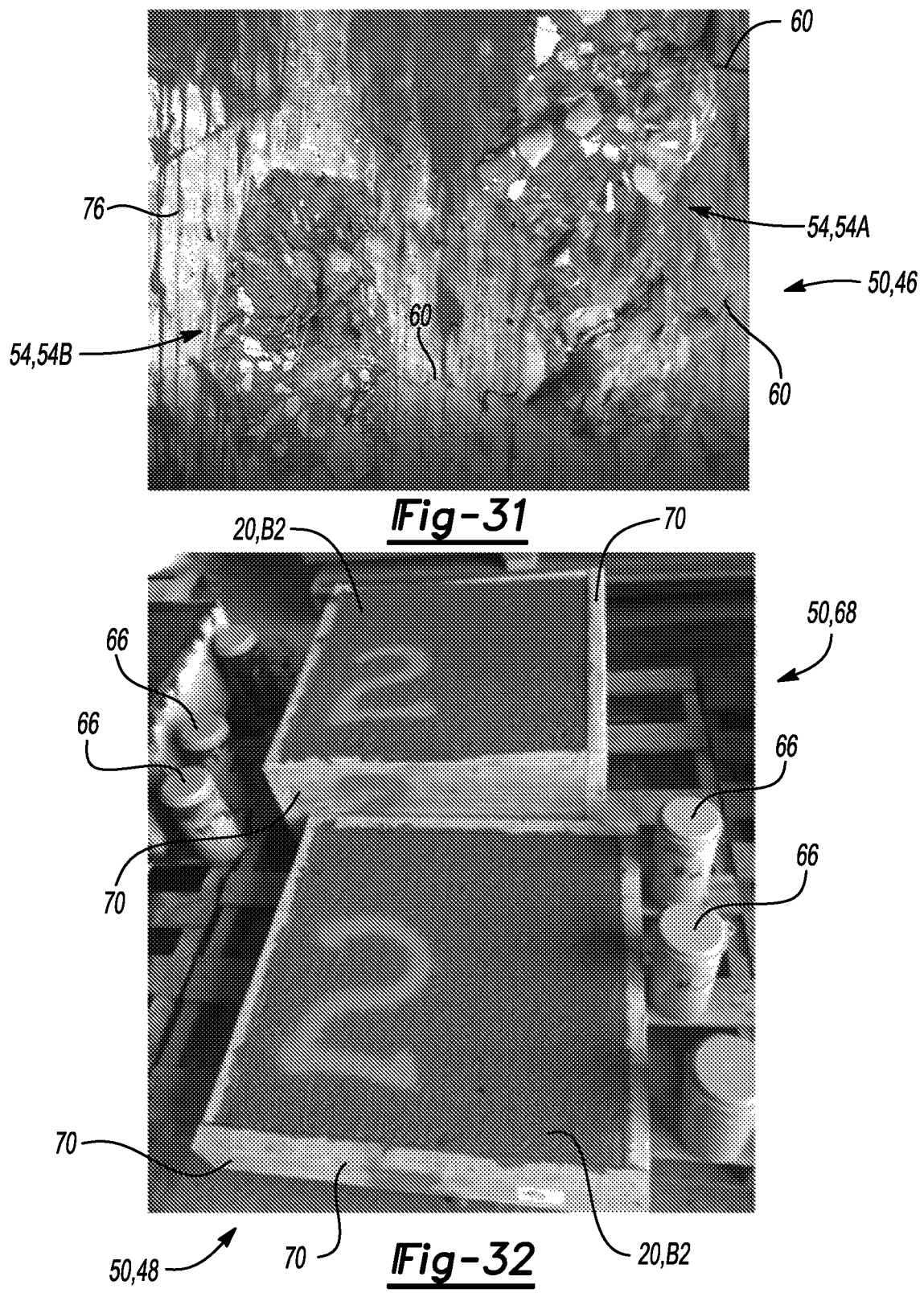

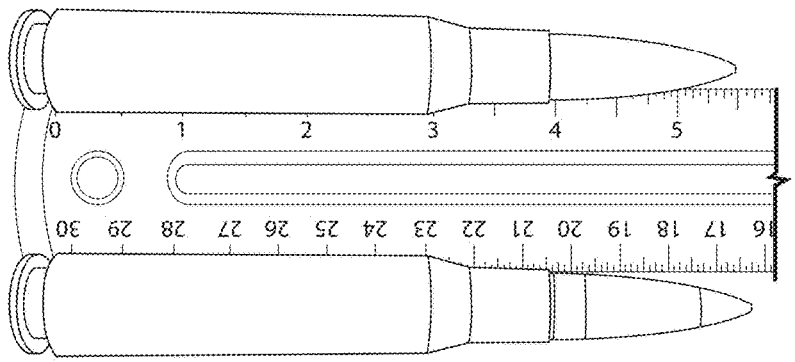
*Fig-55*
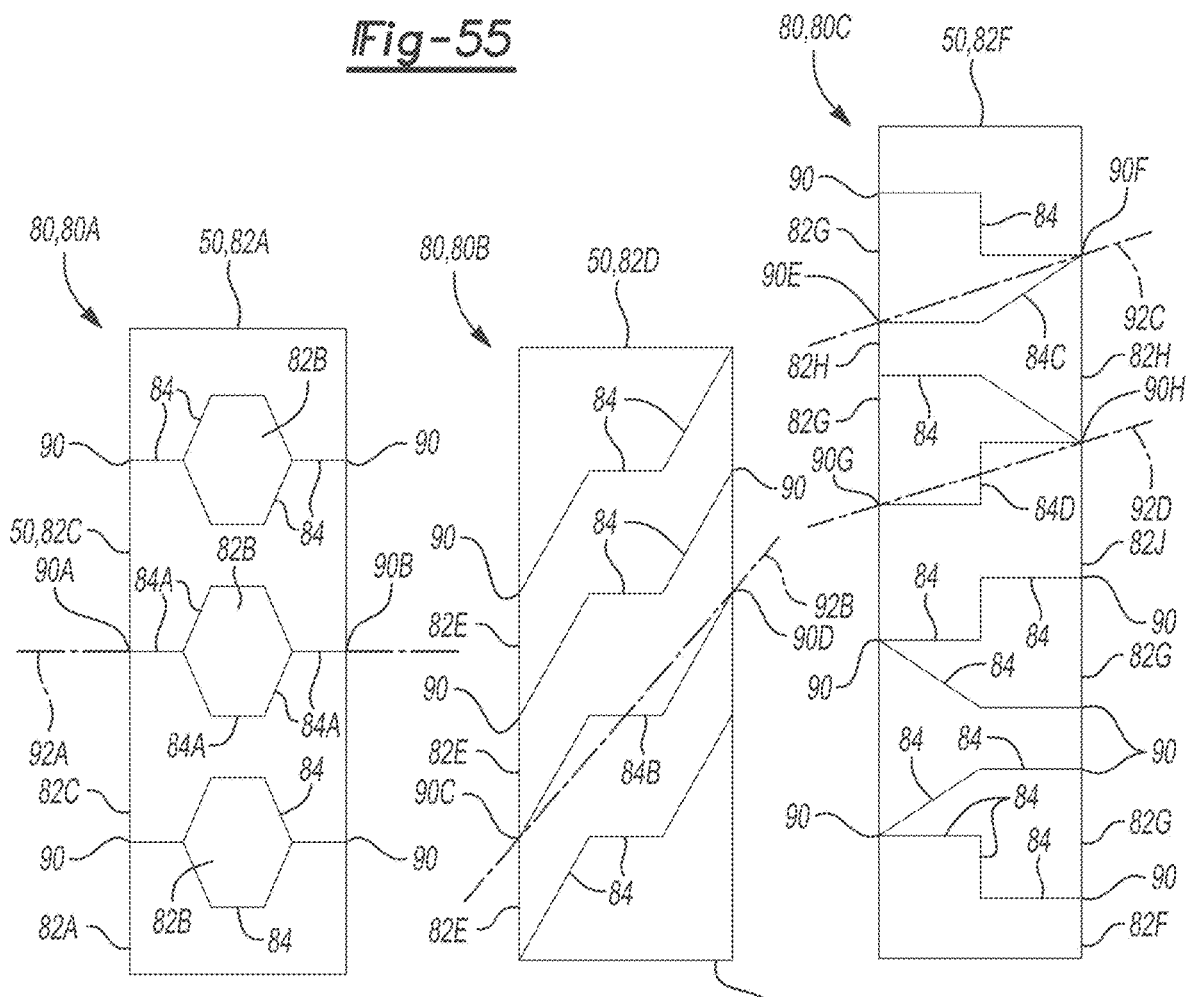
*Fig-56*  *Fig-57*  *Fig-58*

CONCRETE BASED COMPOSITE MATERIAL AND METHOD OF MAKING A STRUCTURAL ELEMENT THEREFROM

CROSS-REFERENCE TO RELATED APPLICATIONS

This application claims the benefit of U.S. Provisional Application No. 62/898,769, filed Sep. 11, 2019, and U.S. Provisional Application No. 62/898,771, filed Sep. 11, 2019, each of which is hereby incorporated by reference in its entirety.

TECHNICAL FIELD

The present disclosure relates to a concrete-based composite material containing iron rich particles, and a method of making a structural element therefrom.

BACKGROUND

This invention relates to a concrete-based composite material for civil engineering uses such as construction of structural elements made of the composite material, and construction of structures formed from the structural elements.

Structural elements and structures made of concrete and utilized in the construction of ballistic resistant components and ballistic resistant structures can be susceptible to spalling, scabbing and cracking resulting from projectiles impacting the concrete, where the debris spray from concrete remnants, chunks etc. broken or blasted away from the concrete structure on either side of the structure can present an injury risk to adjacent structures or persons caught near the debris spray.

The compression strength and energy absorption characteristics of the concrete material comprising structural elements and structures are determinative of the level of blast force and/or projectile penetration which can be sustained by the structural elements and structures without compromising the integrity of the structural elements and/or the structure. Filler materials such as steel fibers are known to increase the compressive strength of a concrete-based material, however can also increase the brittleness of the material, thus decreasing the energy absorption capacity of the concrete-based material, such that steel fiber reinforced concrete can be susceptible to potentially damaging spalling, cracking, and in thinner sections, penetration and/or separation. As such, it would be advantageous to increase the energy absorption capability of a concrete-based material while retaining high compressive strength, to improve the ballistic resistance of the resultant concrete-based material.

SUMMARY

A concrete-based composite material for civil engineering uses such as construction of structural elements made of the composite material, and construction of structures formed from the structural elements is described herein. The concrete-based composite material includes iron rich particles of a type and in an amount such that a structural element formed of the composite material has ballistic resistant properties attributable to the energy absorption characteristics of the iron rich particles included in the composite material described herein.

By way of example, the composite material can have an iron content greater than 17% by weight of the composite material, can include iron particles which are an iron by-product recovered from iron slag material, can include iron rich particles which have an iron content of at least 60% by weight of the iron rich particles, and/or can include iron particles having a particle size distribution in the range of about $-\frac{3}{8}$ inch ($-0.375$ inch) to $+60$ mesh, and/or in the range of about $-20$ mesh to about $+60$ mesh. The composite material containing the iron particles can be characterized as a high strength concrete exhibiting a 28-day compressive strength of at least 5,800 pounds per square inch (PSI). In one example, the composite material exhibits a 28-day compressive strength of at least about 7,800 PSI. In one example, the composite material containing the iron particles exhibits a 7-day compressive strength of at least 4,500 pounds per square inch (PSI). The composite material can be reinforced with fiber elements, which can include metal, polymeric, organic, synthetic, or natural fibers, or a combination of these. The composite material can include ground granulated blast furnace slag as a portion of the cementitious component of the composite material.

The composite material described herein can be used as a ballistic resistant material. As such, when cast into structural elements, the ballistic resistance of the structural elements formed from the composite material have demonstrated performance under ballistic testing which meets the requirements of a Level 10 rating as identified by UL752, an Underwriters Laboratories (UL) standard, and/or the equivalent rating under National Institute of Justice (NIJ) rating criteria for ballistic resistance.

A method of forming a structural element is described herein, which can include casting the structural element using at least one of a molding form, an integral mold, and/or a collapsible mold. In one example, the mold can be made of a polymeric material for lightweight and portable use. In one example, the structural element is coated with and/or encased in a polymeric material to provide a coated structural element, where the coating may be made of an elastomeric polymer such as a polyurea-based material. In this example, the coating may function to encase the surface of the coated structural element to contain spall and/or fragmentation generated when the structural element is subjected to a loading force, which can include a ballistic and/or percussive force, and/or such that spall and/or fragmentation remains substantially within the coating, and such that the shape integrity of the structural element and a post-impact level of ballistic resistance by the structural element is retained after impact. The structural elements can be formed into interlocking shapes which can be arranged into a structure, such that the joint interface between adjacent blocks is non-planar, to increase ballistic resistance of the structure by improving the resistance of the structure to ballistic attack at the joint interface.

The relatively higher level of iron content of the composite material described herein provides environmental advantages, for example, due to a relatively lower emission of greenhouse gases during casting and curing of the composite material, and due to the recyclability of the composite material, for example, as charge stock to an iron or steel refining operation.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 1 is a table illustrating compositions of various mixtures of a concrete-based iron rich composite material as further described herein, showing component amounts in pounds per cubic yard (Lbs/CuYd) of the mixture, each mixture containing iron particles as further described herein;

FIG. 1A is a continuation of the table of FIG. 1, showing component amounts in parts by weight on a basis of 100 parts by weight of the cementitious component of the mixture;

FIG. 2 is a continuation of the table of FIGS. 1 and 1A, illustrating physical properties and performance characteristics, including ballistic resistance characteristics, of each of the various mixtures of the iron rich composite material described in the table shown in FIG. 1 and continuing in FIGS. 1A and 2;

FIG. 7 is a photographic image of a perspective view of precast blocks made of the mixture A3 as described in the table shown in FIG. 1 and continuing in FIGS. 1A and 2;

FIG. 8 is a photographic image of a perspective view of precast blocks made of mixture A3, coated with a polymer coating;

FIG. 9 is a photographic image of a front side view of first, second and third (left, middle, right as viewed in the photograph) precast blocks of FIG. 7, positioned for ballistic testing;

FIG. 31 is a photographic image of the fracture faces of the first and second target craters of the precast wall of FIG. 18 after impact, respectively, by third and first projectiles;

FIG. 32 is a photographic image showing casting of compression test samples and casting of ballistic test slabs made of mixture B2 in wooden casting forms, including casting of a ballistic test slab having a thickness T1 of about 3½ inches and including a reinforcing mesh positioned as shown in FIGS. 33 and 34, and casting of a ballistic test slab having a thickness T2 of about 9¼ inches and including two layers of reinforcing mesh positioned as shown in FIGS. 33 and 35;

FIG. 53 further shows the method of positioning and bracing the slab during ballistic testing, where base board of the casting form serves as a witness plate during shooting of the sample;

FIG. 55 is a photographic image of example .50-caliber full metal jacketed (FMJ) rifle bullets of the type used in ballistic testing of the structural elements composed of the composite material;

FIG. 56 is a schematic illustration of a cross-section of an example structure formed from structural elements;

FIG. 57 is a schematic illustration of a cross-section of another example structure formed from structural elements;

FIG. 58 is a schematic illustration of a cross-section of another example structure formed from structural elements.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 59:
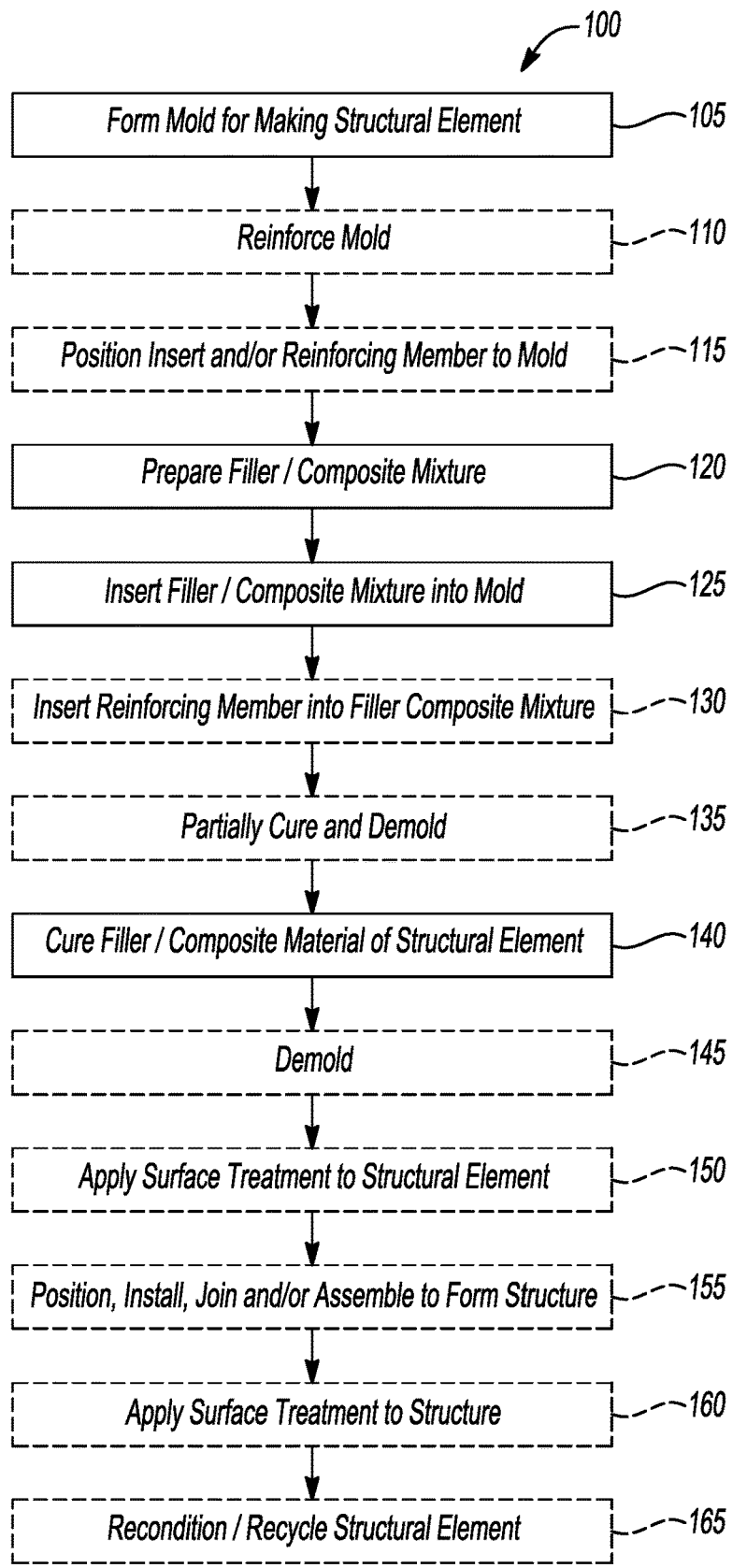
FIG. 59 is a schematic illustration of an example method for forming a structural element and a structure therefrom, using a composite mixture containing iron particles.

Referring to the drawings wherein like reference numbers represent like components throughout the several figures, the elements shown in FIGS. 1-59 are not necessarily to scale or proportion. Accordingly, the particular dimensions and applications provided in the drawings presented herein are not to be considered limiting.

A concrete-based composite material for civil engineering uses such as construction of structural elements made of the composite material, and construction of structures formed from the structural elements, is described herein. The concrete-based composite material described herein is distinguished by the inclusion of iron particles in the mixture forming the composite material. The concrete-based composite material is also referred to herein as an iron rich composite material, and/or as a composite material, which is made of a mixture of components including one or more types of iron particles. A type of iron particle may be distinguished from another type of iron particle by one or more of the source material from which the iron particle is obtained, the size and/or size distribution of the iron particles in the type, the shape and/or shapes of the iron particles in the type, and/or the iron content and/or range of iron content in the iron particles in the type. A mixture may be referred to herein as a composition and may include a plurality of components exemplary of a concrete-based material.

Referring to the figures, a variety of example mixtures A1, A2, A3, B1, B2, B3, B4, B5, B6, B7 of the iron rich composite material 10 are disclosed in the table generally indicated at 10 in FIGS. 1, 1A and 2, where FIGS. 1, 1A and 2 are also referred to herein collectively as Table I, where the example mixtures A1, A2, A3, B1, B2, B3, B4, B5, B6, B7 are non-limiting example compositions which are exemplary of the iron rich composite material described herein. The example mixtures A1, A2, A3, B1, B2, B3, B4, B5, B6, B7 can be referred to collectively herein as example mixtures 20, which are exemplary of various compositions of the iron rich composite material 10. Each of the mixtures 20 was prepared for testing as a batch, such that a mixture 20 may also be referred to herein as a batch 20 and/or as a respective batch A1, A2, A3, B1, B2, B3, B4, B5, B6, B7. One or more of the mixtures A1, A2, A3, B1, B2, B3, B4, B5, B6, B7 can be referred to herein as a mixture 20 or as a group of mixtures 20. Batches A1, A2, A3 can be referred to collectively as the Group A batches. Likewise, batches B1, B2, B3, B4, B5, B6, B7 can be referred to collectively as the Group B batches.

Figure 18:
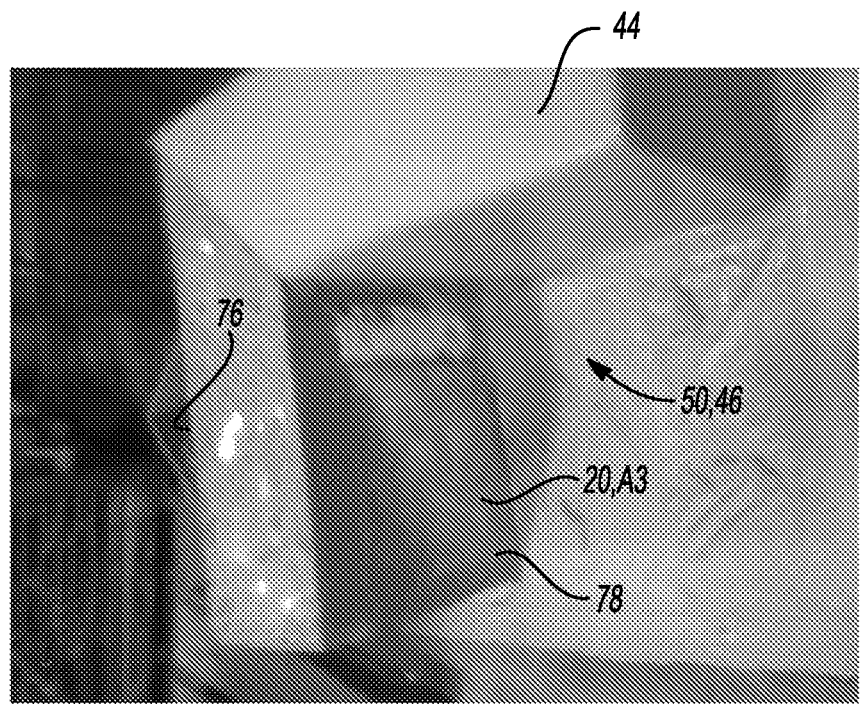
FIG. 18 is a photographic image of a top perspective view of a precast wall section made of mixture A3 as described in the table shown in FIG. 1 and continuing in FIGS. 1A and 2, and partially coated with a polymeric coating.

The iron-rich composite material 10 includes iron particles 30 which, when dispersed in the composite material are energy absorbent and strengthen the composite material, and as such, increase the ballistic resistance, toughness, and/or compression strength of the iron rich composite material 10 as compared with a concrete-based material which does not include iron particles and/or which includes iron particles in a concentration less than the range disclosed herein. Structural elements 50 (see FIGS. 7, 18, 32, showing examples 42, 46, 48, 68 of structural elements 50) made from mixtures A3, B1, B2, B3 of the iron rich composite material 10 have been evaluated for ballistic resistance, as further described herein, and are advantaged by improved ballistic resistance attributable to the addition of iron particles 30 to the composite material 10.

One or more methods and/or examples of forming structural elements 50 containing the iron rich composite material and forming structures 80 using the iron rich composite material 10 and/or structural elements 50 containing the iron rich composite material 10 are described herein. By way of example, a structure 80 may be formed as a joint-free structural element 50 and/or may be made of a plurality of structural elements 50 which can be assembled such that the structural elements 50 interlock to form one or more non-planar joints 90 (see FIGS. 55-57). The non-planar joints 90 of interlocked structural elements 50 contribute to the ballistic resistance of the structure by minimizing susceptibility to ballistic penetration through and/or separation at a joint interface of the structure.

Referring to Table I shown in FIGS. 1, 1A and 2, the composition of each example mixture 20 is shown in Table I, wherein the amount of each material in the mixture is expressed in FIG. 1 in pounds per cubic yard (Lbs./CuYd) of the material, and is expressed in FIG. 1A in parts by weight on a basis of 100 parts by weight of the cementitious component. As shown in Table I, each of the mixtures 20 includes a cementitious component 12, a sand component 14, an aggregate component 16, a fiber component 18, and a water component 22. Further, at least one admixture 24 has been added to each of the mixtures 20 during preparation thereof. Each of the batches shown in Table I was prepared in conformance with ASTM C31—Standard Practice for Making and Curing Concrete Test Specimens in the Field, and test specimens prepared from each of the mixtures 20 were tested for compression strength after curing for 7 days after pouring and for compression strength after curing for 28 days after pouring, in conformance with ASTM 39—Standard Test Method for Compressive Strength of Cylindrical Concrete Specimens.

The cementitious component 12 of the mixtures 20 includes at least one of portland cement and ground granulated blast furnace slag (GGBFS), in amounts as shown in Table I. In a non-limiting example, the portland cement used in mixtures 20 shown in Table I was a Type 1, St Mary's cement. As shown in Table I, the Group A batches (A1, A2 and A3) were prepared using a cement component 12 including only portland cement, and the Group B batches (B1, B2, B3, B4, B5, B6, B7) were prepared using a cementitious component 12 including portland cement and GGBFS. GGBFS is typically obtained by quenching molten blast-furnace slag to form a glassy granular material which is dried and pulverized, and is characterized by a very low, e.g., less than about 5% by weight or more typically about 0.5% to 2.0% iron by weight. In batches B6 and B7, GGBFS was included in an amount of about 10% by weight of the cementitious component 12, and in the remaining Group B batches, GGBFS was included in an amount of about 40% by weight of the cementitious component 12. The use of GGBFS as a portion of the cementitious component 12 is advantaged by providing an environmental benefit of reducing the amount of greenhouse gases emitted from the concrete-based composite material 10, and by contributing to a relatively higher compressive strength or the composite material 10 when compared to a like composition having a cementitious component 12 comprising natural sand only or a lesser fraction of GGBFS in the cementitious compound 12.

The sand component 14 of the mixtures 20 includes at least one of fine aggregate sand and iron particles 30. In the example mixtures 20, the fine aggregate sand comprising the sand component 14 was a 2NS (natural sand) aggregate comprising natural sand particles sized from about −⅜" (9.5 mm) to about +200 mesh (75 μm).

The iron particles 30 comprising the sand component 14 used in the example batches 20 include iron particles 30 of at least one of three types shown in Table I identified as Type I, Type II and Type III. As indicated in Table I, the designation IP-I can be used to identify a plurality of iron particles of Type I, the designation IP-II can be used to identify a plurality of iron particles of Type II, and the designation IP-III can be used to identify a plurality of iron particles of for example, in the figures and description.

In a non-limiting example, the iron particles comprising IP-I and IP-II can include iron rich particles which are yielded as an iron by-product 26 from processing of an iron-containing slag-based material, for example, as described in U.S. Pat. No. 9,016,477 B2 issued Apr. 28, 2015, commonly owned by applicant and incorporated herein by reference in its entirety, using a method including one or more of size-classifying, grinding, and magnetically separating the iron rich particles 30 from iron-containing slag-based raw material to generate the iron by-product 26. In the present example, the iron by-product 26 can be separated by processing from an iron-containing slag-based raw material which can include waste material from the steel and iron producing industry, slag generated in a blast furnace, a converter, a basic oxygen furnace (BOF), or an electric furnace, and/or one or more of the types of slag commonly referred to as blast furnace slag, kish slag, c-scrap slag, desulfurization slag, and/or a combination of these. The iron by-product 26 including iron particles IP-I and IP-II used in the various mixtures 20 can include, a non-limiting example, iron rich particles as described in U.S. Pat. No. 9,016,477 B2, which can include iron particles 30 having a medium iron content of about 55% iron (Fe) to about 80% iron (Fe) or about 60% iron (Fe) to about 80% iron (Fe), and can include iron particles 30 having a high iron content of at least about 85% iron or greater than about 88% iron. The iron particles 30 comprising the iron by-product 26 can include particles of varying sizes, as described in U.S. Pat. No. 9,016,477 B2. As further described herein, each of the iron content of the iron particles 30 in the iron by-product 26, the size distribution of the iron particles 30 in the iron by-product 26, and the weight percentage of the iron by-product 26 in each respective mixture 20 contributes to the resultant compressive strength, energy absorption capacity, and ballistic performance of the respective mixture 20. In an embodiment, the sand component has an iron rich particle content of at least 60% by weight of the sand component.

In a non-limiting example, iron particles 30 of Type I (IP-I) include iron rich by-product 26 separated from iron-containing slag-based raw material, for example, using a method substantially as described in U.S. Pat. No. 9,016,477 B2. In the present example, the iron rich by-product 26 comprising the Type I (IP-I) iron particles 30 is characterized by a medium iron content of about 60% to about 80% by weight of the iron particle, having a specific gravity in the range of about 4.02 to 5.36, and a particle size of −20 mesh. In one example, the particle size distribution of the Type I (IP-I) iron particles 30 is in a range of about −20 mesh to about +40 mesh. In one example, the particle size distribution of the Type I (IP-I) iron particles 30 is in a range of about −20 mesh to about +60 mesh.

In a non-limiting example, iron particles 30 of Type II (IP-II) include iron rich by-product 26 separated from iron-containing slag-based raw material, for example, using a method substantially as described in U.S. Pat. No. 9,016,477 B2. In the present example, the iron rich by-product 26 comprising the Type II (IP-II) iron particles 30 is characterized by a high iron content of about 85% to about 92% by weight of the iron particle, having a specific gravity in the range of about 5.24 to 6.07, and a particle size distribution ranging from +40 mesh to about −⅜" (0.375 inches), where the larger particles in the range of +¼" to −⅜" can be characterized as nuggets and/or as having a nugget-like appearance. In the non-limiting example represented by mixture A3, the particle size distribution of the Type II (IP-II) iron particles 30 is about 43% in the range of about (−⅜" to +8 mesh), about 39% in the range of about (−8 mesh to +20 mesh) and about 18% in the range of about (−20 mesh to +40 mesh).

In a non-limiting example, iron particles 30 of Type III (IP-III) include magnetite powder 28 having about 90% purity such that the estimated iron content of the magnetite powder 28 is about 65% iron (Fe). The magnetite powder 28 is characterized by a particle size of −200 mesh.

Table I shows the calculated range of the iron (Fe) content of each mixture 20, as a percent by weight of the mixture, and a calculated average iron content of each mixture, as a percent by weight of the mixture (see FIGS. 1 and 1A). In FIG. 2, Table I shows a calculated average iron content of the iron particles 30 in each mixture 20.

The iron particles 30 comprising IP-I and IP-II iron by-product 26 and the iron particles 30 comprising IP-III magnetite powder 28 exhibit different morphologies, differences in size distribution, differences in iron (Fe) content, and as such, each of the IP-I, IP-II and IP-III type iron particles 30 contribute differently to the resultant compressive strength, energy absorption capacity, and ballistic performance of the respective mixture 20. The examples are non-limiting, and other iron particles 30 having other morphologies and/or derived from other iron sources, for example, crushed iron sponge, atomized iron slag, powdered iron, etc., could be included in iron particles 30 and/or be combined with iron by-products 26 and/or magnetite 28 within the range of iron content of the mixture described herein, to produce variations of iron rich composite material 10.

Referring again to Table I, the aggregate component 16 of the mixtures 20 includes at least one of a coarse limestone, such as 6AA crushed limestone, coarse riverstone, and peastone, also referred to as pea gravel or gravel, with each example mixture 20 including an amount of the aggregate component 16 as indicated in Table I.

The fiber component 18 of the mixtures 20 includes at least one of a steel fiber and a polymeric fiber. As shown in Table I, the Group A batches (A1, A2 and A3) include steel fibers in each respective Group A batch, and the Group B batches (B1, B2, B3, B4, B5, B6, B7) include polymer fibers in each respective Group B batch. The steel fibers include a combination of short and long strand straight and barbed fibers distributed uniformly in the mixture 20. By way of non-limiting example, the polymer fibers including in each respective Group B batch were polypropylene olefin fibers having a length of about 0.75". Other examples of fiber component 18 which could be included to add tensile strength and/or elasticity to the composite material 10 may be selected from the group consisting of: steel fibers, synthetic fibers, polymer fibers, organic fibers, natural inorganic fibers, and the like, and combinations thereof. In one example, the fiber component 18 can include non-metallic fibers such as silk strands including spider silk and/or worm silk, synthetic silk fibers, natural fibers such as goat hair, and/or a combination of these.

The water component 22 of the mixtures 20 includes potable water batched into the mixture 20 and added on the job during the preparation of the batch mixture 20. Referring again to Table I, various admixtures 24 were used in preparation of the mixtures 20. As shown in Table I, the Group B batches included a lignosulfonate-based admixture AM1, and the Group A batches were prepared using a combination of multiple admixtures including a polycarboxylate based admixture AM2, a non-chloride water reducer type admixture AM3, and an alpha-olefin air entrainer type admixture AM4.

Referring now to the continuation of Table I shown in FIG. 2, during preparation of each mixture 20, test samples 66 (see FIG. 35, for example) were prepared in conformance with ASTM C31 and subsequently tested in accordance with ASTM C39 to evaluate the compressive strength of each mixture 20 at 7-days curing time, and at 28-days curing time. Results of the compressive strength tests are summarized in FIG. 2, showing an average compressive strength of each mixture 20 based on testing of multiple samples. The break type observed for each mixture 20 is also indicated in FIG. 2. Slump testing was completed during preparation of the mixtures 20, with the results shown in Table I for each respective mixture 20. Unit weight per cubic foot was measured pre-cure, at time of pour, for each mixture 20, with the results shown in Table I for each respective mixture 20.

Figure 3:
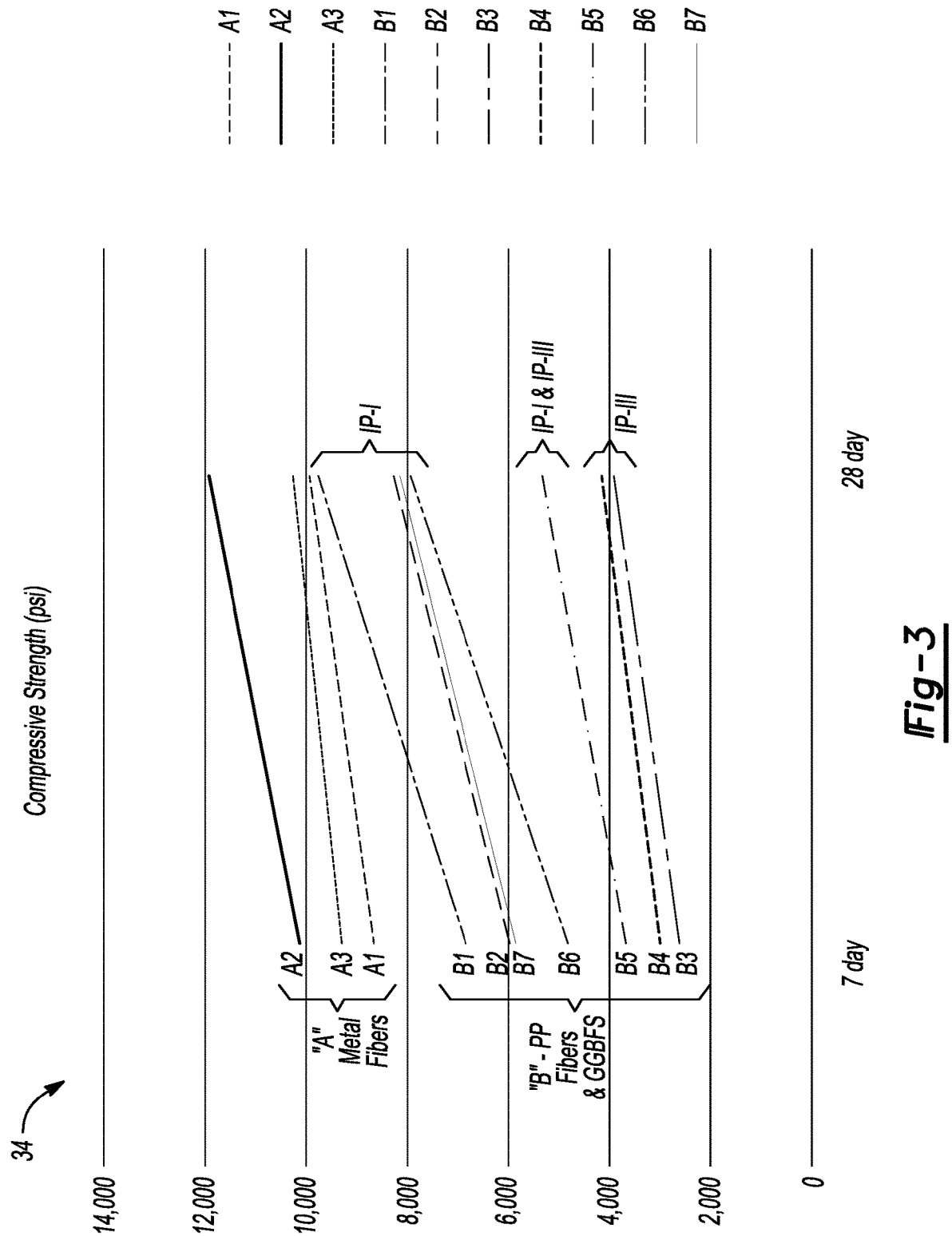
FIG. 3 is a graphical representation of compression strength test results at 7-days cure time and at 28-days cure time, for the various mixtures of the composite material described in the table shown in FIG. 1 and continuing in FIGS. 1A and 2.

Referring to FIG. 3, the 7-day compressive strength test results and the 28-day compressive strength test results are graphically displayed in graph 34 for each of the example mixtures 20. As illustrated in graph 34, each mixture A1, A2, A3 of the Group A batches and mixtures B1, B2, B6, B7 of the Group B batches can be characterized as a high strength concrete (HSC), where the term "high strength concrete", as used herein, refers to a concrete-based material having a 28-day compressive strength of greater than 6,000 psi (42 Mpa). Compressive strength testing was also performed at 2-days and at 3-days on mixtures A1, A2 and A3, with the results shown in Table II.

TABLE II

| Compressive Strength PSI (Break type) | 2 days | 3 days |
|---|---|---|
| Group A - Mixture A1 (IP-I) | 6,420 (3) | 8,190 (3) |
| Group A - Mixture A2 (IP-I) | 7,360 (3) | 9,050 (3) |
| Group A - Mixture A3 (IP-II) | 1,520 (5) | 8,020 (5) |

Compressive strength test results are not available for the Group A batches, however the 2-day test results shown in Table II indicate that mixtures A1, A2 containing Type I (IP-I) iron particles could exhibit the characteristics of high early strength concrete (HESC), where the term "high early strength concrete" as used herein, refers to a concrete-based material having a 24-hour compressive strength of greater than 3,045 psi (21 Mpa). As illustrated in graph 34, the Group A mixtures 20 demonstrated relatively higher 7-day compressive strength than the Group B mixtures 20, which may be attributable in part to differences in the fiber component 18 in each group. The steel fibers included in the Group A mixtures 20 contribute to the relatively higher compressive strength, however, as noted in Table I, mixtures A1 and A2 also demonstrate a break type 3 for cylinder fracture during testing, indicating a less ductile structure than the Group B mixtures including a polymeric fiber component 18.

Group B mixtures B1, B2, B6, B7 containing Type I iron particles 26, 30, indicated on graph 34 as IP-I, demonstrated relatively higher 7-day compressive strength than the remainder of the Group B mixtures containing either a combination of Type I iron particles 26, 30 and Type III iron particles 28, 30 or only IP-III iron particles 28, 30. Comparing Group B mixtures B1, B2, B6, B7 each including IP-I iron particles 26, 30, graph 34 illustrates mixtures B1, B2 exhibiting relatively higher compressive strength than mixtures B6, B7, which may be attributable to the higher GGBFS content in mixtures B1, B2 as compared with mixtures B6, B7. Comparing Group B mixtures B3, B4, B5, graph 34 illustrates mixture B5 exhibiting relatively higher compressive strength than mixtures B3, B4, which may be attributable to the larger particle size and/or distribution of particle sizes in the IP-I iron particles 26 included in mixture B5, as compared with the fine powder of IP-III in mixtures B3, B4.

Figure 4:
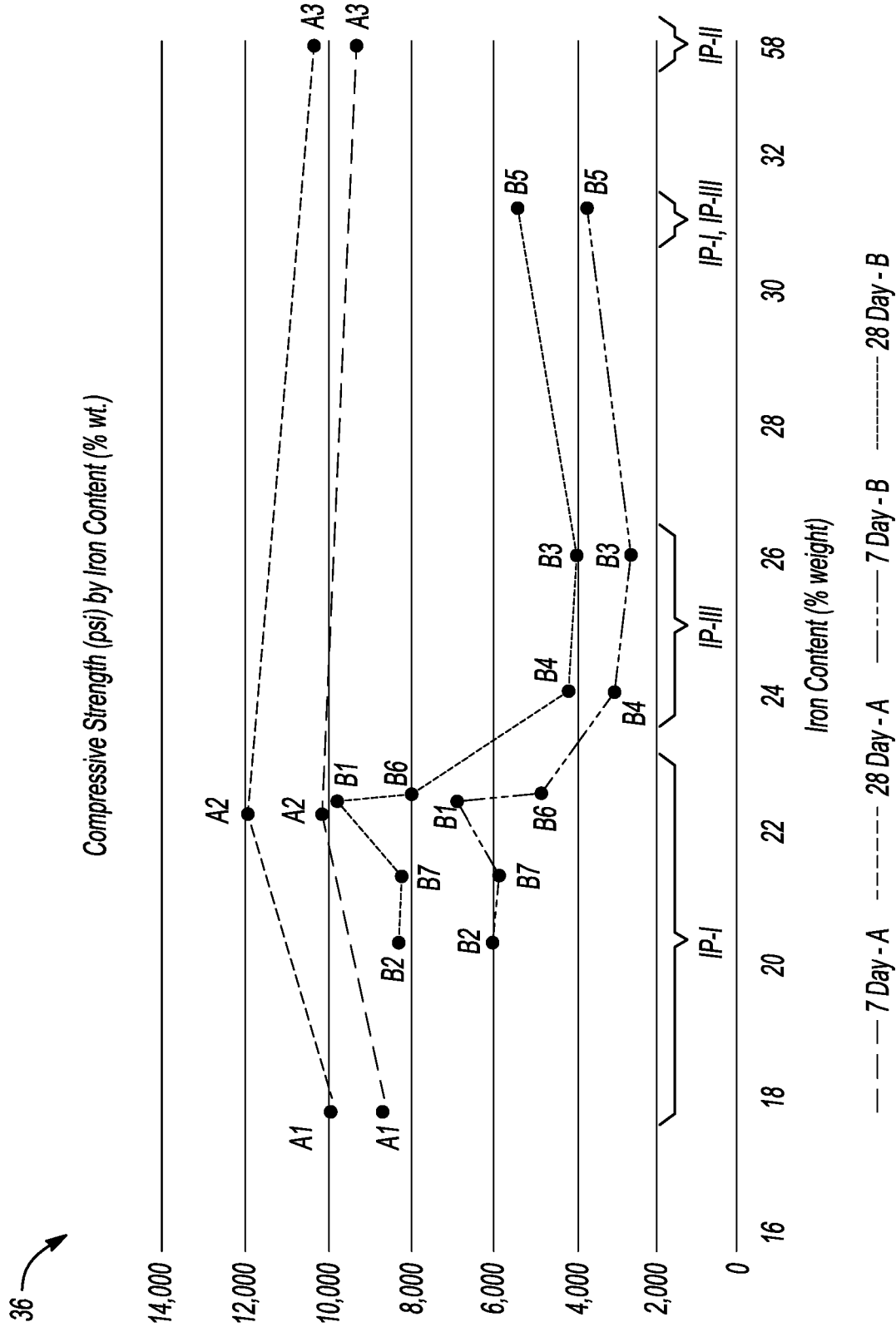
FIG. 4 is a graphical representation of compression strength test results by iron content, for multiple example mixtures of the composite material described in the table shown in FIG. 1 and continuing in FIGS. 1A and 2.

Referring now to FIG. 4, shown is a graph 36 illustrating the observed relationship between the average iron (Fe) content by weight of each of the sample mixtures 20 and the average compressive strength exhibited the respective sample mixture 20 at 7-day cure time and at 28-day cure time. Group A mixtures 20 exhibit a relatively higher compressive strength as compared with Group B mixtures 20, which as discussed previously may be attributable in part to the differences in the fiber component 18 of each group. Comparing mixtures A1 and A2, each comprising Type-I (IP-I) iron particles, an increase in compressive strength is associated with increasing iron content in the mixture 20. Similarly, comparing mixtures B1 and B2, each also comprising Type-I (IP-I) iron particles, an increase in compressive strength is associated with increasing iron content by percent weight in the mixture 20, all other components 12, 14, 16, 18, 22, 24 in mixtures B1 and B2 being comparable in amount. Comparing mixtures B1 and B6, which are substantially similar in iron content by weight percent, indicates the relatively higher compressive strength of mixture B1 may be attributable to the increased GGBFS content in the cementitious component 12 of mixture B1 as compared to mixture B6.

Still referring to FIG. 4, comparing mixtures B3, B4, B5 to mixtures B1, B2, B6, B7, mixtures B3, B4, B5 are characterized by a relatively higher iron content by percent weight, however, do not demonstrate an associated increase in compressive strength but rather demonstrate a lower compressive strength as compared with mixtures B1, B2, B6, B7. Comparing mixtures B3, B4 with mixtures B1, B2, it is noted that each of the mixtures B1, B2, B3, B4 each have substantially the same composition of cementitious component 12, aggregate component 16, fiber component 18, water component 22, and admixture component 24, differing only in the sand component 14 of each respective mixture 20.

As shown in Table I, mixtures B1, B2 comprise Type-I (IP-I) iron particles 30 which as previously described are an iron by-product 26 recovered from raw slag material and having a particle size distribution of about −20 mesh to about +60 mesh, and mixtures B3, B4 comprise Type-III (IP-III) which comprise magnetite powder having a particle size of about −200 mesh. Mixtures B1, B2 have an iron (Fe) content by weight in the range of about 20.4% to 22.5%, and mixtures B3, B4 have a relatively higher iron (Fe) content by weight in the range of about 24.1% to 31.2%. Comparing the compressive strengths of mixtures B1, B2 (IP-I) to mixtures B3, B4 (IP-III) indicates that increasing iron content by weight above the percent weight contained in mixtures B1, B2, does not result in a commensurate increase in compressive strength. Comparing the compressive strengths of mixture B3 (26.1% Fe by wt. in mixture) to mixture B4 (24.1% Fe by wt. in mixture), with both B3, B4 mixtures comprising iron particles 30 of only IP-III magnetite power 28, may indicate that increasing iron content by weight in the mixture 20 does not result in a commensurate increase in compressive strength, as shown by the relatively lower compressive strength of mixture B3 as compared with mixture B4. By comparing the compressive strengths of mixture B1 (IP-I with 22.5% Fe by wt. in mixture) and mixture B4 (IP-III with 24.1% Fe by wt. in mixture) it may be observed that the smaller particle size and/or the morphology of the magnetite powder 28 comprising IP-III does not result in a commensurate increase in compressive strength.

It would be appreciated that differences in the mechanical behavior, including compressive strength, spalling, cracking and other responses to loading may be attributable to differences in one or more of the morphology, particle size, particle shape, particle type, iron content, etc., of each of the particle types IP-I, IP-II, IP-III which would necessarily affect the mechanisms by which each of these particle types interact with, bind to, and/or separate from each other and/or other constituent materials of the various components 12, 14, 16, 18, 22, 24 of the composite mixture 20, either during mixing, casting, curing, and/or loading of the composite mixture 20 and resultant composite material 10 and/or a structural element 50 formed therefrom.

Figure 5:
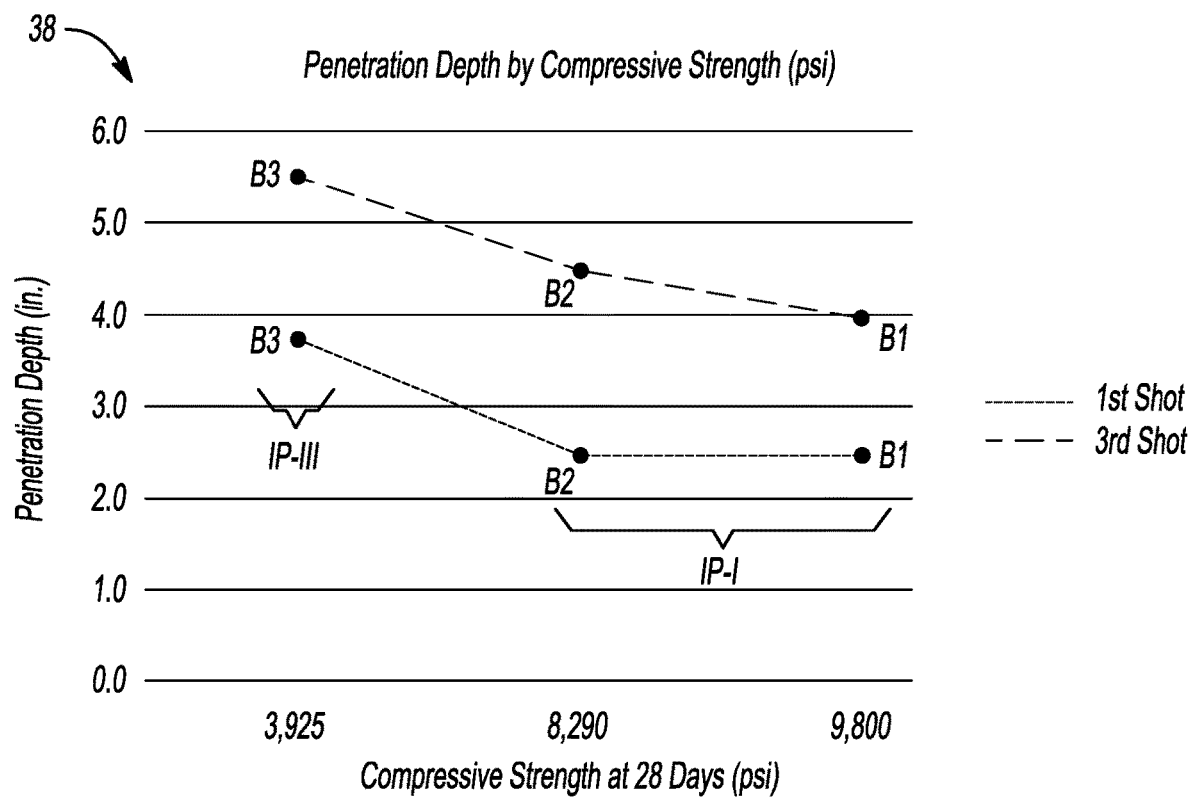
FIG. 5 is a graphical representation of penetration depth of a projectile into a structural element made of the composite material, as related to the compression strength of the mixture of composite material.
Figure 6:
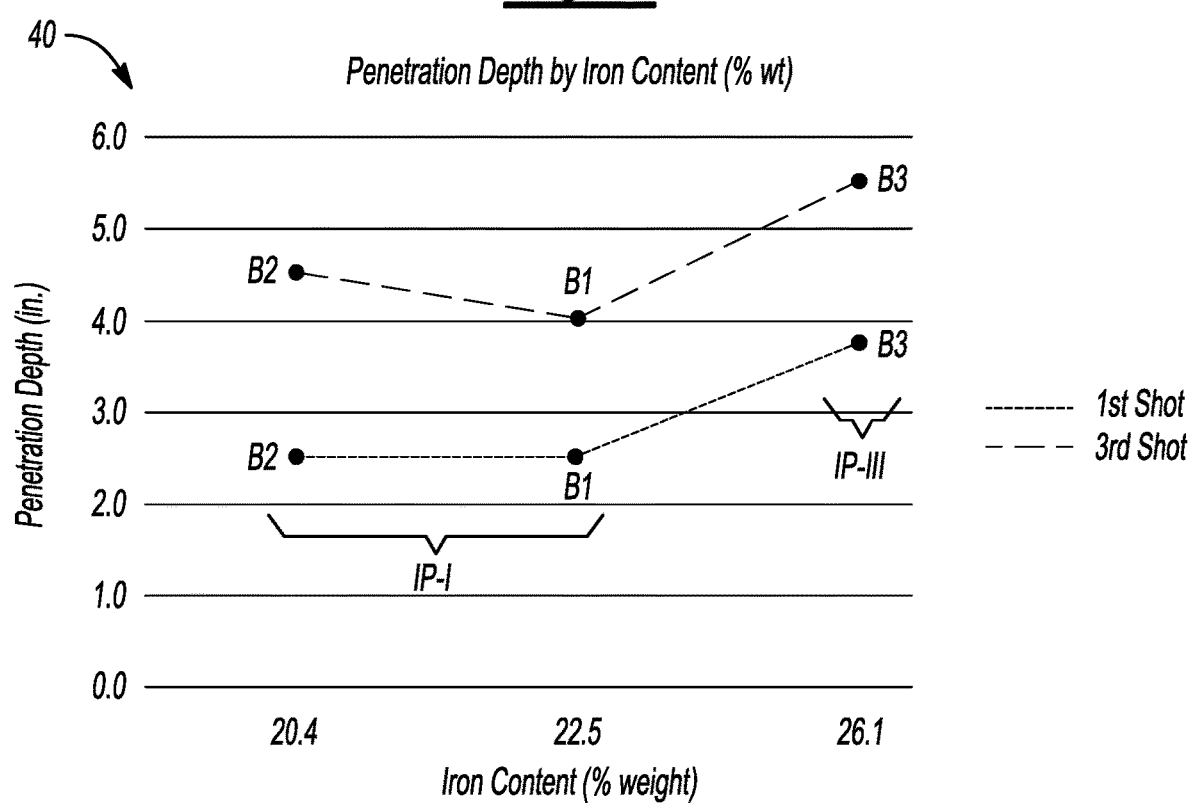
FIG. 6 is a graphical representation of penetration depth of a projectile into a structural element by iron content of the mixture of composite material from which the structural element is made.
Figure 10:
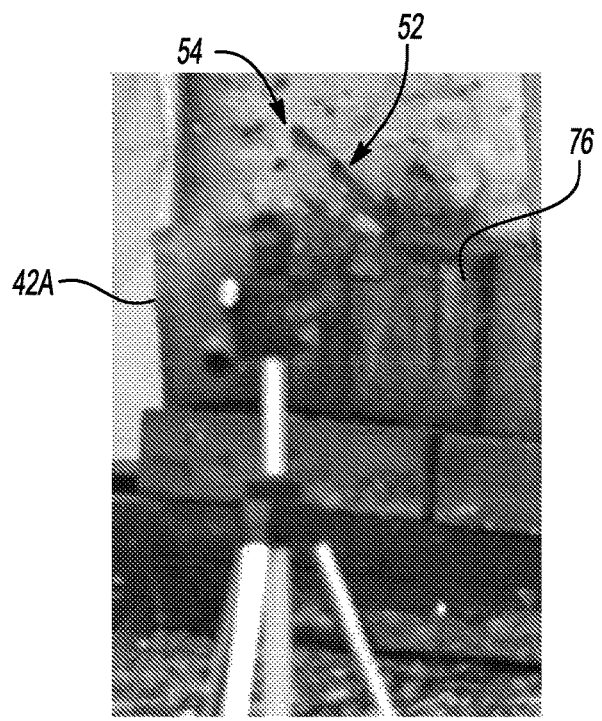
FIG. 10 is a photographic image of a front side view of the first (left) precast block of FIG. 9 at time of impact by a projectile.
Figure 11:
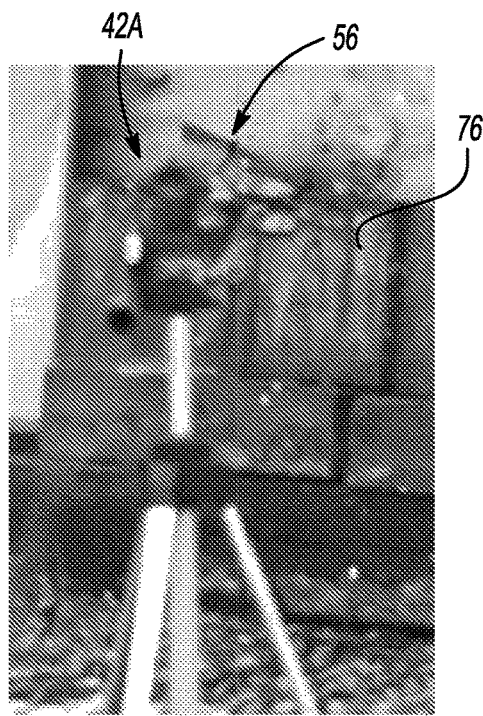
FIG. 11 is a photographic image of a front side view of the first (left) precast block of FIG. 9 after impact.
Figure 12:
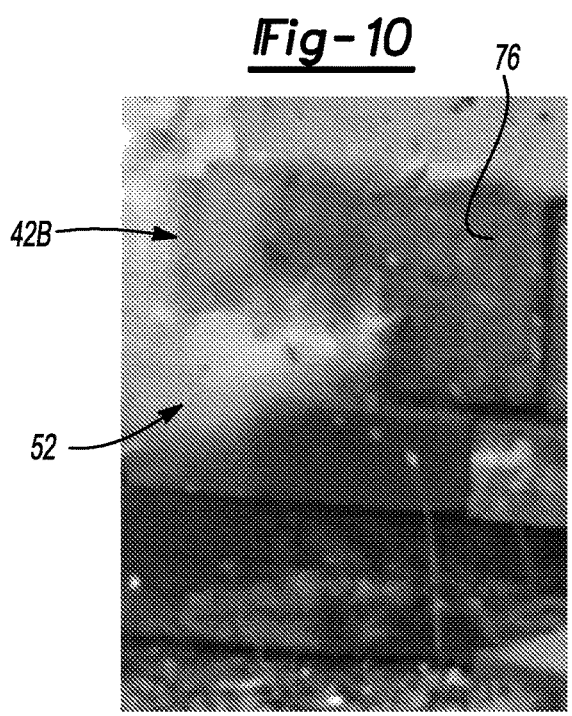
FIG. 12 is a photographic image of a front side view of the second (middle) precast block of FIG. 9 at time of impact by a projectile.
Figure 13:
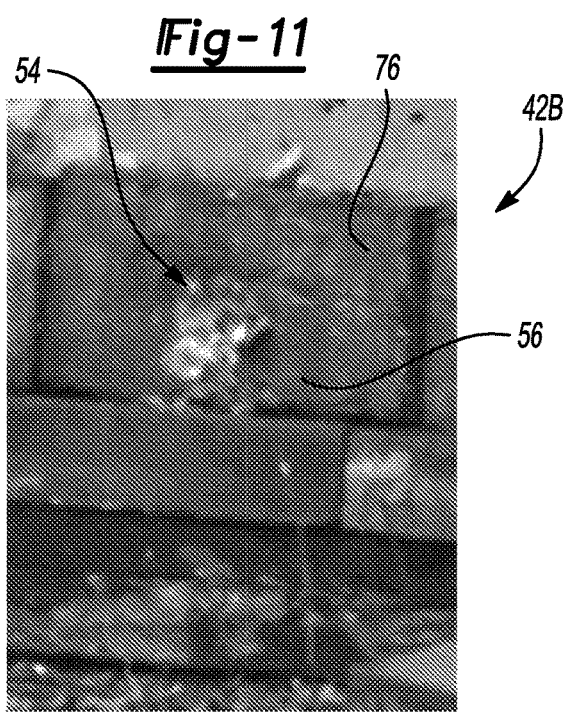
FIG. 13 is a photographic image of a front side view of the second (middle) precast block of FIG. 9 after impact.
Figure 14:
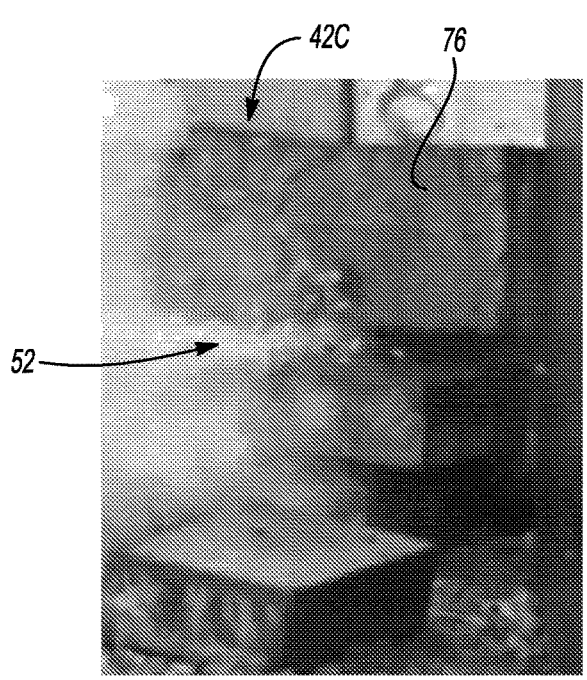
FIG. 14 is a photographic image of a front side view of the third (right) precast block of FIG. 9 at time of impact by a projectile.
Figure 15:
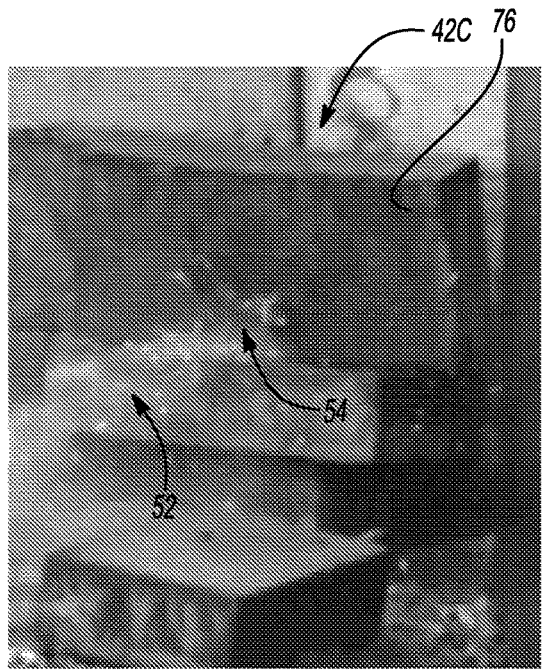
FIG. 15 is a photographic image of a front side view of the third (right) precast block of FIG. 9 immediately after impact.
Figure 16:
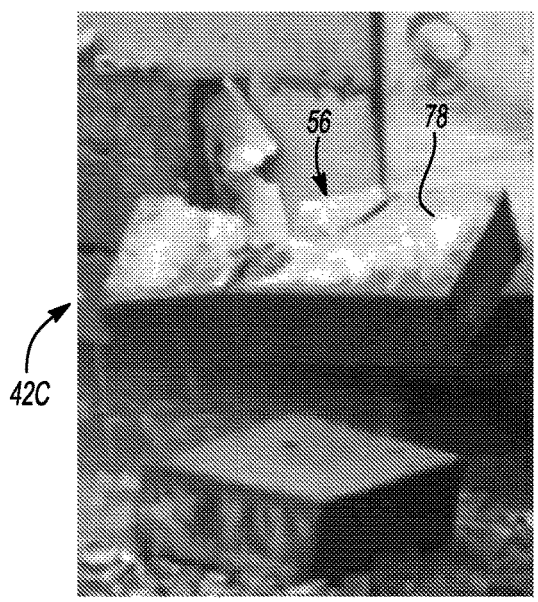
FIG. 16 is a photographic image of a front side view of the third (right) precast block of FIG. 9 displaced from its initial position after impact.

Referring now to FIGS. 5-55, structural elements 50 made from selected mixtures 20 were evaluated for ballistic performance, including resistance to penetration of the structural element 50 by a projectile. The ballistic test results 32 of projectile testing are included in Table I at FIG. 2, shown graphically in graphs 38 and 40 in FIGS. 5 and 6, and illustrated by the photographic images included in FIGS. 7-52. Ballistic testing included preparation of structural elements 50 from mixtures A3, B1, B2 and B3 in various shapes and sizes, including test blocks 42, a test wall 46 and test slabs 48, 68, as further described herein, and testing these with .50-caliber full metal jacketed (FMJ) rifle rounds of the type shown in FIG. 55, shot at target structural element 50 from a distance of 100 yards using a semi-automatic .50-caliber rifle. A round may also be referred to herein as a bullet, a shell, and/or as a projectile.

Figure 19:
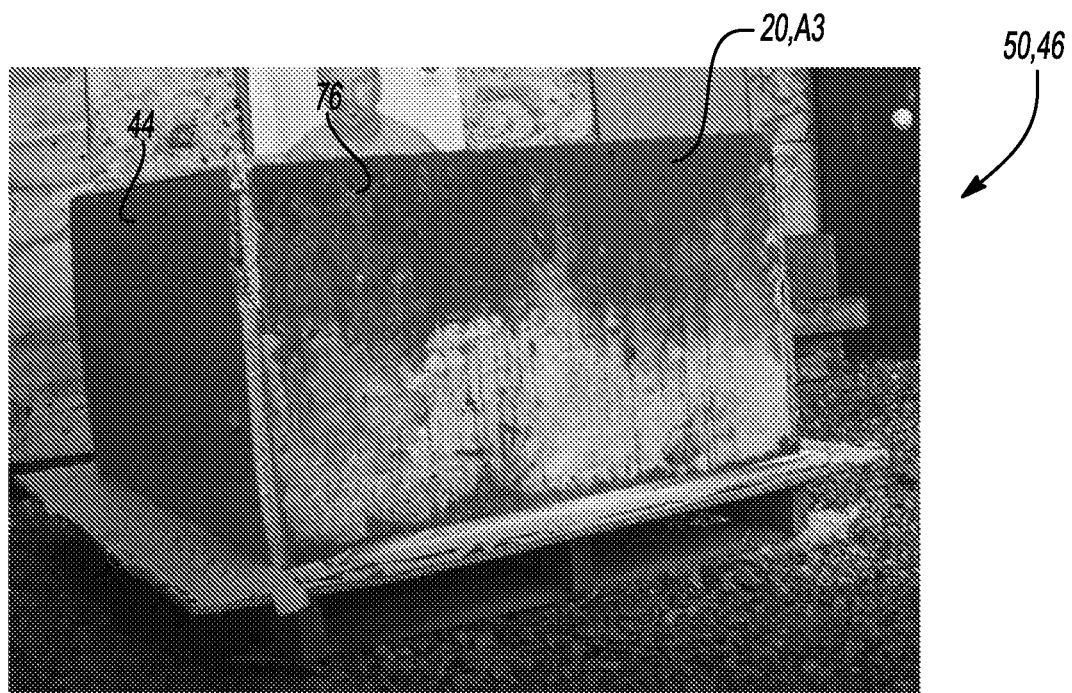
FIG. 19 is a photographic image of a front perspective view of the precast wall of FIG. 18 marked with a first target.

FIG. 7 is a photographic image of structural elements 50 formed as test blocks 42 from each of the Group A mixtures 20. The test blocks 42 shown in FIG. 7 are about 4 inches in thickness, about 8 inches in width, and about 16 inches in length. FIGS. 18-19 are photographic images of a structural element 50 formed as a wall 46, where the wall 46 is formed of composite mixture A3. The wall 46 shown in FIGS. 17 and 18 has a thickness of about 12 inches, and includes reinforcing bars (rebar) positioned in two layers parallel to the side faces 76, 78 of the wall 46, such that rebar is positioned internal to the wall 46 in a first layer about 2.5 inches to about 3 inches inward from a first wall face 76 of the wall 46, and in a second layer about 2.5 inches to about 3 inches inward from the opposing wall face 78 of the wall 46. In the present example, the reinforcing bar is #6 steel rebar grade 60, having a nominal diameter of 0.750 inches and a minimum yield strength of 60,000 pounds per square inch (PSI).

FIG. 8 is a photographic image of structural elements 50 formed as test blocks 42 made of composite mixture A3 and coated after casting and curing the blocks 42, with an elastomeric polymer material such that the block 42 is fully encased by a coating 44 formed on the surface of the block 42. In the present example the coating 44 is formed of a polyurea-based coating material such as a coating material marketed as a Line-X®, PAXCON®, or Rhino Linings® type coating material. In the present example, the coating is applied at a thickness of about 0.25 inches uniformly applied to the surface of the block 42.

The coating functions to encapsulate the composite material 10 of the structural element 50, for example, to contain, confine, restrain, and/or encapsulate spall and/or ballistic fragmentation produced during a ballistic attack on the structural element 50, to decelerate, impede, and/or hinder the spray of the spall and/or ballistic fragmentation, and/or to contain composite material 10 which may separate from the structural element 50 as a result of cracking, fragmentation, crumbling, etc., for example, as a result of impact, explosion, percussion, or other force loading of the block 42. In the example shown in FIG. 8, test blocks 42 formed from composite mixture A3 were coated with a spray-on polyurea coating 44 to obtain a coating thickness of between about 0.25 inches and 0.5 inches.

The coated test blocks 42 were dropped from a test height of 50 feet to assess the effect of drop loading on the coated block 42. After being dropped from a height of 50 feet, the A3 composite material comprising the cast block 42 was substantially crumbled within the coating 44, such that the composite material 10 forming the block 42, e.g., the structural element 50 in a crumbled condition provides ballistic resistance at a modified level. The coating 44 responded elastically to the impact such that the coating 44 remained intact, fully containing the crumbled composite material 10 within the coating 44 and such that the impacted block 42 substantially retained the original rectangular shape of the block. As such, the impacted block 42 remained functional as a structural element 50, usable, for example, in forming a structure 50 such as a stacked block wall.

Figure 17:
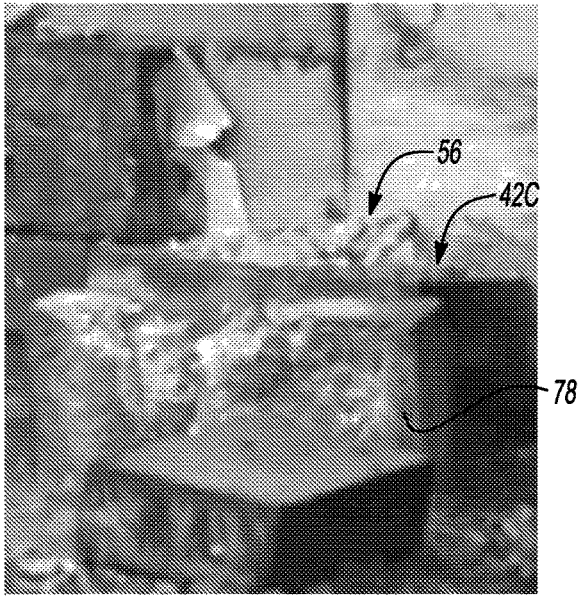
FIG. 17 is a photographic image of a front side view of the third (right) precast block of FIG. 9 showing the block condition after impact and displacement.

The ballistic resistance of the impacted block 42 was not tested in the present example, however it would be appreciated that the crumbled composite material 10 contained in the coating 44 would retain a level of ballistic resistance due to the impact absorption and tensile strength characteristics of the iron rich particles distributed in the crumbled composite material 10. Another example of a coated structural element 50 is shown in FIG. 17, where a portion of the surface of wall section 46 is shown coated with an elastomeric polymer such as a polyurea-based material where the thickness of the coating is about 0.25 includes to about 0.5 inches.

Now referring to FIGS. 9-17, shown are photographic images excerpted from video recording taken of ballistic testing of test blocks 42 made of mixture A3. Each test block was shot once with a .50-caliber round, targeting, as shown in the Figures, the bottom third of test block 42A, the central portion of test block 42B, and the upper third of test block 42C. Visual examination of each of the blocks 42A, 42B, 42C indicated each block 42 stopped the .50 caliber round with penetration into the block limited to about one-fourth to about one-half the thickness of the block, e.g., with penetration depth of about 1 to 2 inches. As shown in FIGS. 10, 12, 14 and 15, spall 52 was sprayed from spall craters 54 created in each block 42 on impact by the projectile (bullet). As shown in FIGS. 11, 13, 16 and 17 portions of each block 42A, 42B, 42C crumbled and/or blew apart under percussion, generating debris 56. The high impact resistance, e.g., the observed ability of the test blocks 42 to stop the projectile round at a penetration depth of about 1 to 2 inches may be attributable to the tensile strength and impact absorption capacity of the relatively high iron content of the iron particles IP-II, the relatively high content by weight of the iron particles 26 in the block mixture A3, the steel fiber content of the block mixture A3, and/or a combination of these. The fracture mechanism, e.g., the crumbling of the block due to percussion, may indicate a relatively brittle structure, corresponding to the drop test results previously described herein for test blocks made of the mixture A3 and containing steel fibers. As such, the test blocks 42 made of mixture A3 showed good penetration resistance by stopping the projectile, and, when coated by an elastomeric coating 44, demonstrated the ability to retain shape by retaining the crumbled composite material 10 within the coating 44.

Figure 20:
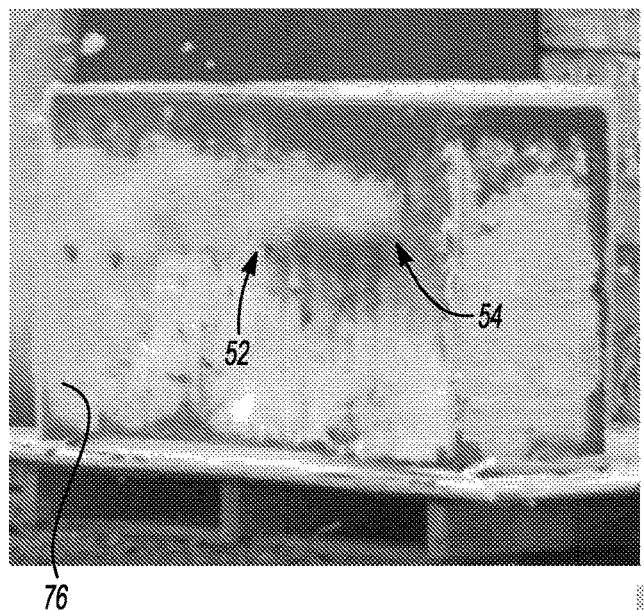
FIG. 20 is a photographic image of a front perspective view of the precast wall of FIG. 18 at time of impact of the first target by a first projectile.
Figure 21:
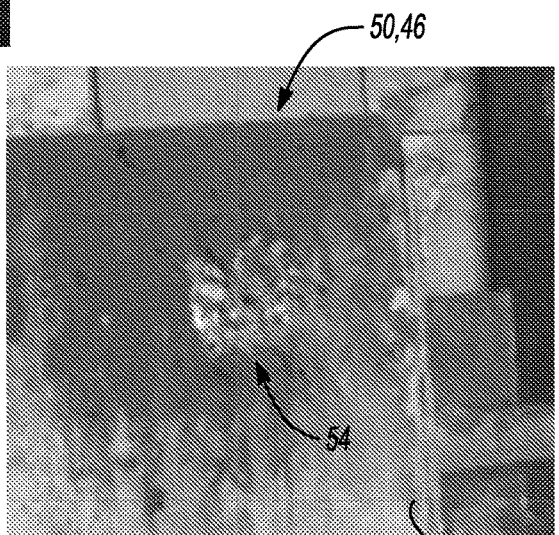
FIG. 21 is a photographic image of a front view of the first target of FIG. 20 after impact by the first projectile.
Figure 22:
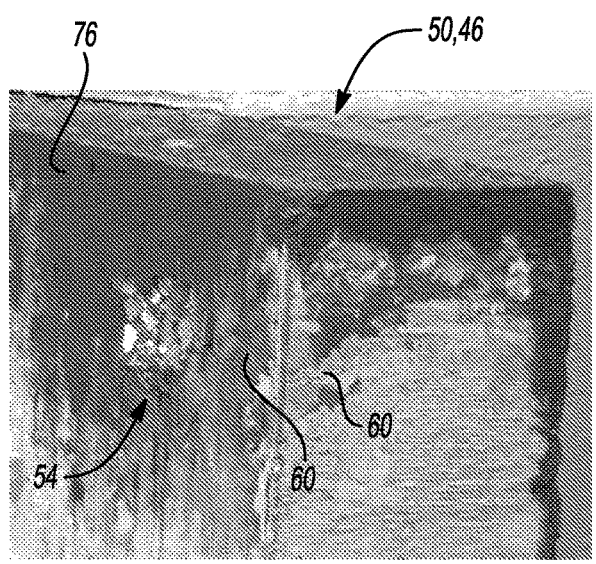
FIG. 22 is a photographic image of a side perspective view of the wall and first target of FIG. 20 after impact by the first projectile.
Figure 23:
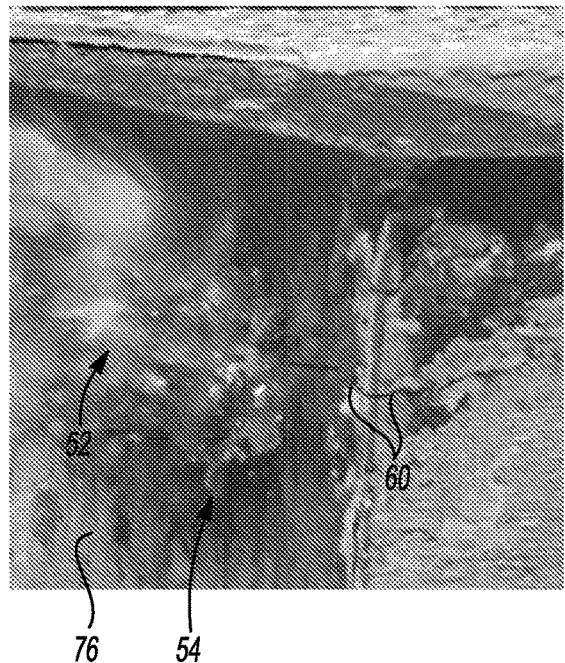
FIG. 23 is a photographic image of a front perspective view of the precast wall of FIG. 18 at time of impact of the first target by a second projectile.
Figure 24:
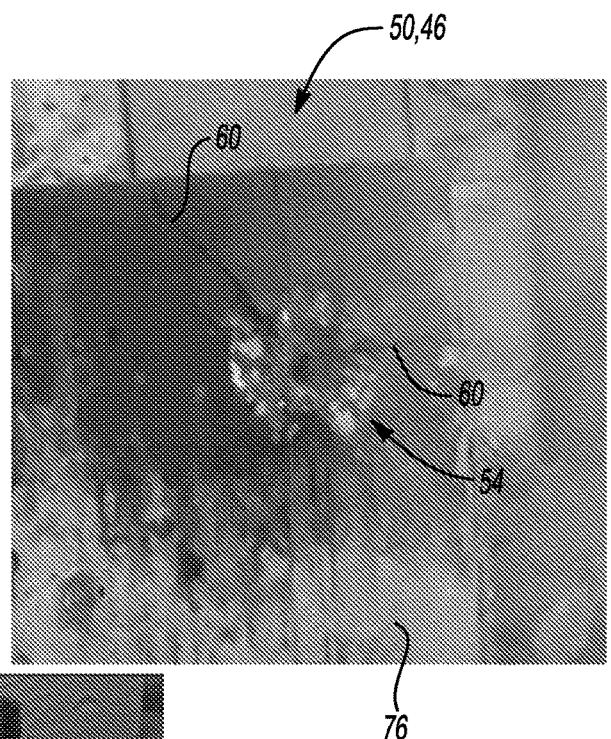
FIG. 24 is a photographic image of a front view of the first target of FIG. 20 after impact by the second projectile.
Figure 25:
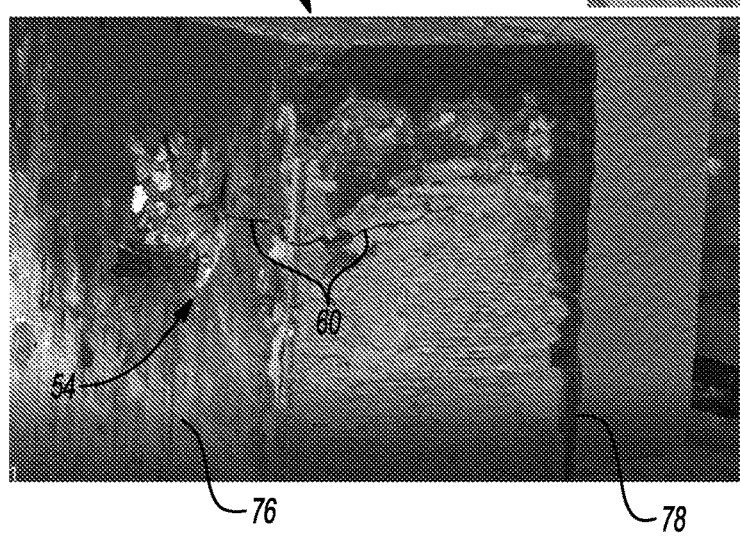
FIG. 25 is a photographic image of a side perspective view of the wall and first target of FIG. 20 after impact by the second projectile.

Ballistic testing was conducted of the wall section 46, as shown in FIGS. 18-31. The wall section 46, made of mixture A3 and having a thickness of about 12 inches, was positioned for testing as shown in FIG. 19, to be shot with a series of .50-caliber bullets into a front face 76 of the wall 46. FIGS. 20-22 are photographic images excerpted from a video recording during shooting of the wall 46 with a first .50-caliber bullet showing spall 52 spraying on impact (FIG. 20) and creating a spall crater 54 surrounding the bullet hole 74 (FIG. 21). The first round was stopped by and retained in the wall 46. As shown in FIG. 22, cracking 60 from the impact face 76 toward the rear face 78 was observed through a partial thickness of the wall 46 and the wall 46 remained intact. FIGS. 23-25 are photographic images excerpted from the video recording during shooting of the wall 46 with a second .50-caliber round targeting the bullet hole 74. As shown in FIGS. 23-25, spall 52 sprayed on impact by the second bullet, the spall crater 54 enlarged and cracks 60 opened. The wall 46 contained the second bullet and remained intact.

Figure 26:
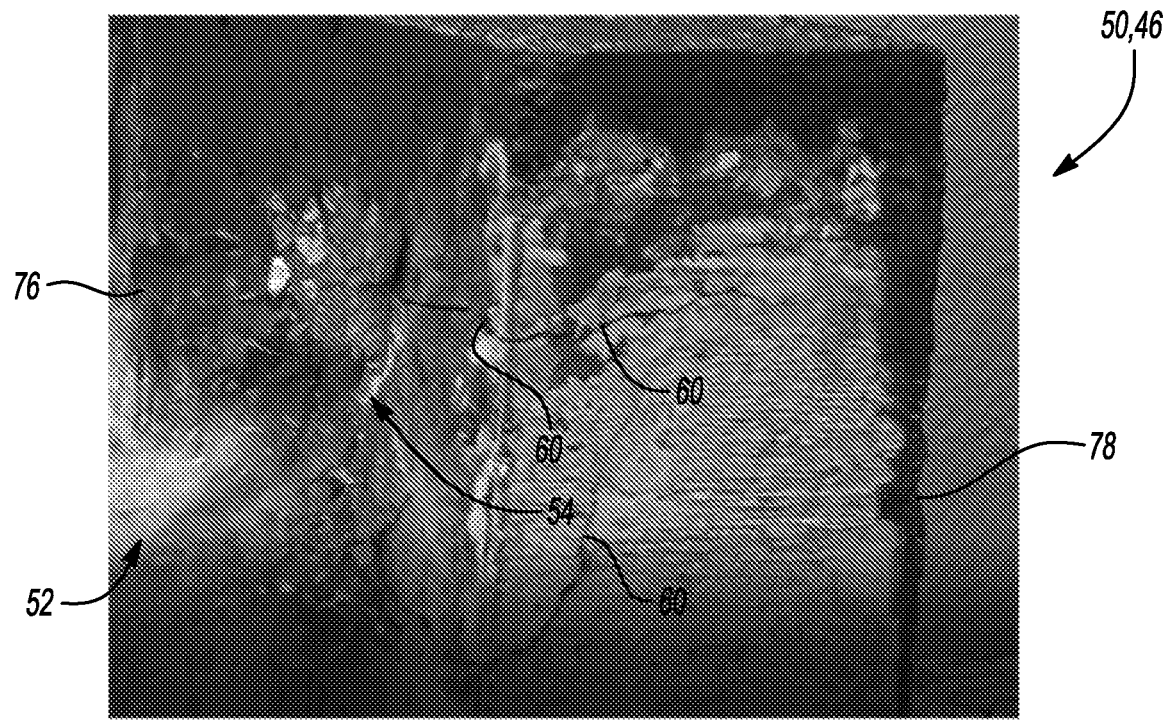
FIG. 26 is a photographic image of a side perspective view of the precast wall of FIG. 18 at time of impact of the first target by a third projectile.
Figure 27:
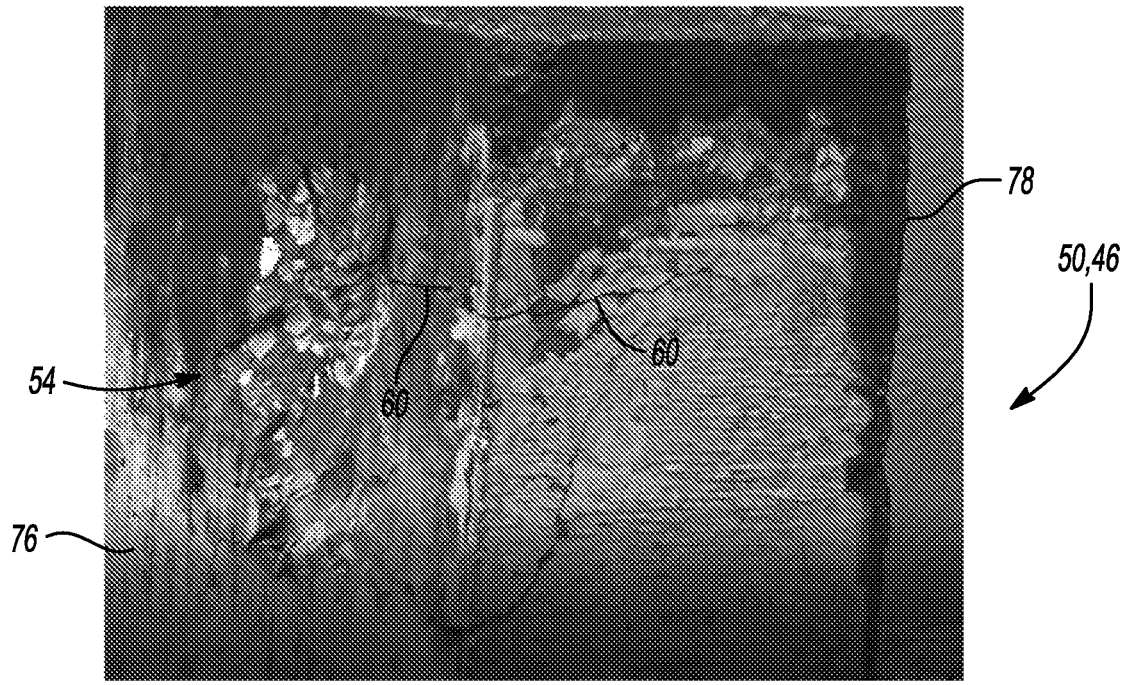
FIG. 27 is a photographic image of a side perspective view of the wall and first target of FIG. 20 after impact by the third projectile.
Figure 28:
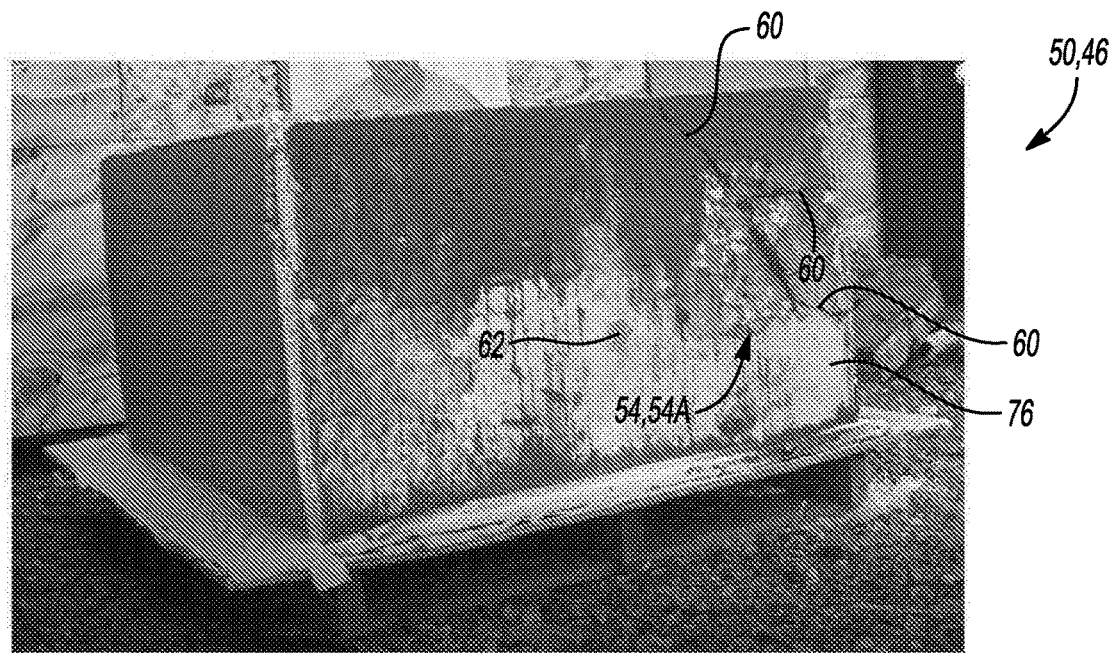
FIG. 28 is a photographic image of a front perspective view of the precast wall of FIG. 18 after impact by the third projectile and marked with a second target.

FIGS. 26-28 are photographic images excerpted from the video recording during shooting of the wall 46 with a third .50-caliber round targeting the bullet hole 74. As shown in FIGS. 26-28, spall 52 sprayed on impact by the third bullet, the spall crater 54 enlarged and additional cracks 60 propagated from the spall crater 54 and through a partial thickness of the wall 46. The wall 46 contained the third bullet and remained intact.

Figure 29:
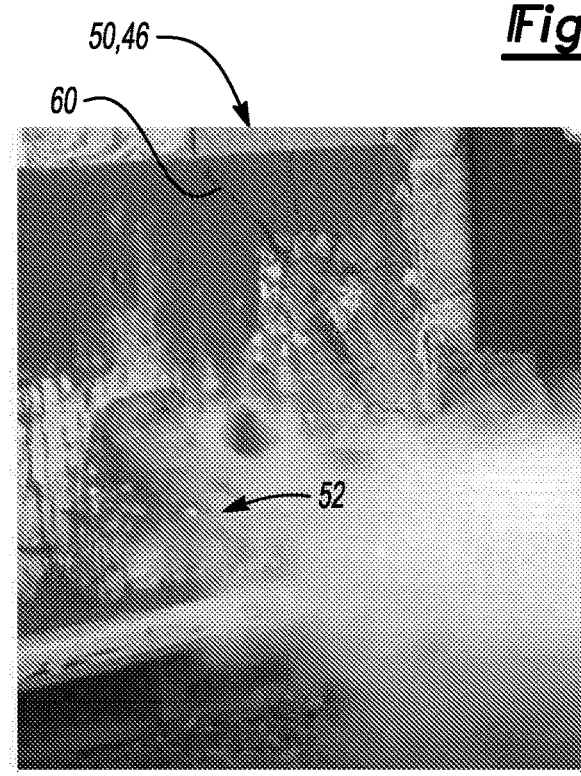
FIG. 29 is a photographic image of a front perspective view of the precast wall of FIG. 18 at time of impact of the second target by a first projectile.
Figure 30:
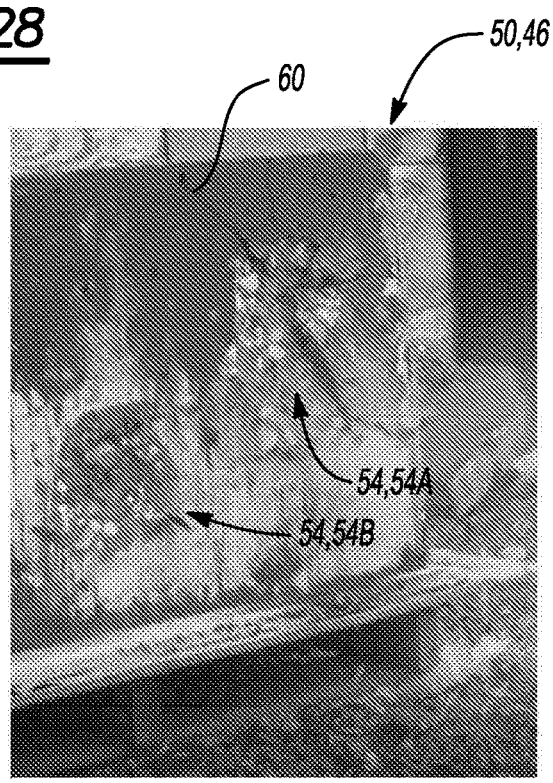
FIG. 30 is a photographic image of a front perspective view of the wall and second target of FIG. 28 after impact of the second target by the first projectile.

FIGS. 28-31 are photographic images excepted from the video recording during shooting of the wall 46 with a fourth .50-caliber round targeting a second target 62 positioned in a central portion of the wall face 76 and outside of the first spall crater 54A created by the first three shots. As shown in FIG. 29, spall 52 sprayed on impact of the wall 46 by the fourth bullet, and a second spall crater 54B was formed. As shown in FIG. 31, crack 60 propagation occurred between the first and second spall craters 54A, 54B. The fourth round was contained in the wall 46 and the wall 46 remained intact.

As shown in FIG. 31, steel fibers 18 comprising the mixture A3 from which the wall 42 was formed are protruding from the crater 54B. As observed regarding test blocks 42, the high impact resistance, e.g., the observed ability of the wall 46 to stop the projectile bullet at a penetration depth less than the thickness of the wall 46 may be attributable to the tensile strength and impact absorption capacity of the relatively high iron content of the iron particles IP-II, the relatively high content by weight of the iron particles 26 in the block mixture A3, the steel fiber content of the block mixture A3, and/or a combination of these. By containing the projectiles (bullets) in the wall 46, which remained intact, the wall 46 made of mixture A3 appears to have demonstrated performance under ballistic testing which meets the requirements of a Level 10 rating as identified by UL752, an Underwriters Laboratories (UL) standard, and/or the equivalent rating under National Institute of Justice (NIJ) rating criteria for ballistic resistance.

Referring again to FIGS. 5 and 6, graphs 38 and 40 summarize the results of the ballistic testing shown in FIGS. 41-54 of test slabs 68 made from mixtures B1, B2, B3, where each of the test slabs 68 was shot with three .50-caliber rounds, the second and third bullets targeting the bullet hole 74 created by the first bullet. The test slabs 48, 68 were prepared as illustrated in FIGS. 32-35, for each of the Group B mixtures 20. As shown in FIG. 32, the ballistic test slabs 48, 68 were cast in wooden molds or forms 70 and were cured for 28 days prior to being ballistically tested (shot). The test slabs 48, 68 were cast in two thicknesses, with the relatively thinner test slab 48 having a thickness T1 (see FIG. 34) of about 3.5 inches, and the relatively thicker test slab 68 having a thickness T2 (see FIG. 35) of about 9.25 inches. Each of the test slabs 48, 68 have a width of about 24 inches and a length of about 24 inches, presenting a square target face 76 when stood on edge during ballistic testing, as shown in FIGS. 36-54.

Figure 33:
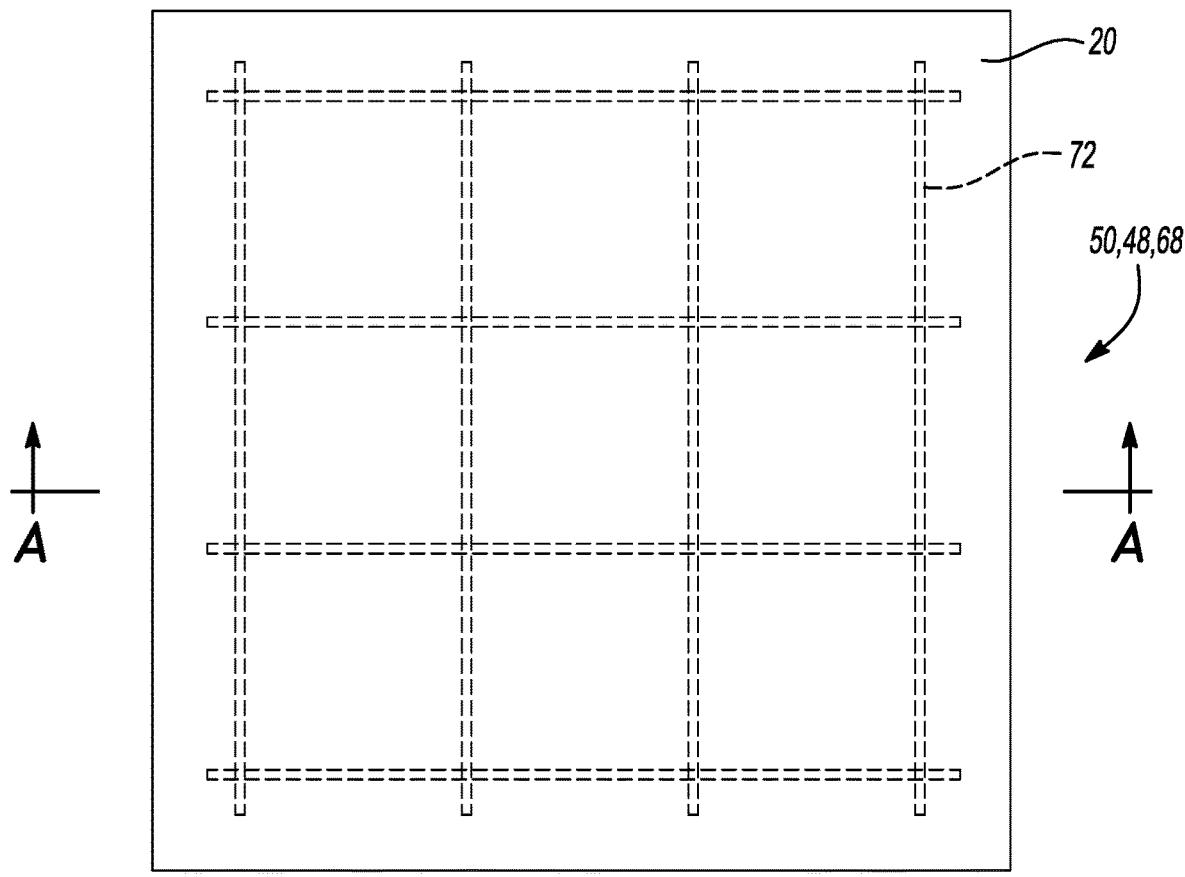
FIG. 33 is a schematic illustration of a top view of a ballistic test slab such as the ballistic test slabs shown in FIG. 32, showing placement of reinforcing mesh within the test slab.
Figure 34:
FIG. 34 is a schematic illustration of a cross-sectional view of section A-A of a ballistic test slab such as the slab shown in FIG. 32, having a thickness T1 and including a single layer of reinforcing mesh positioned at about midway through the thickness of the slab.
Figure 35:
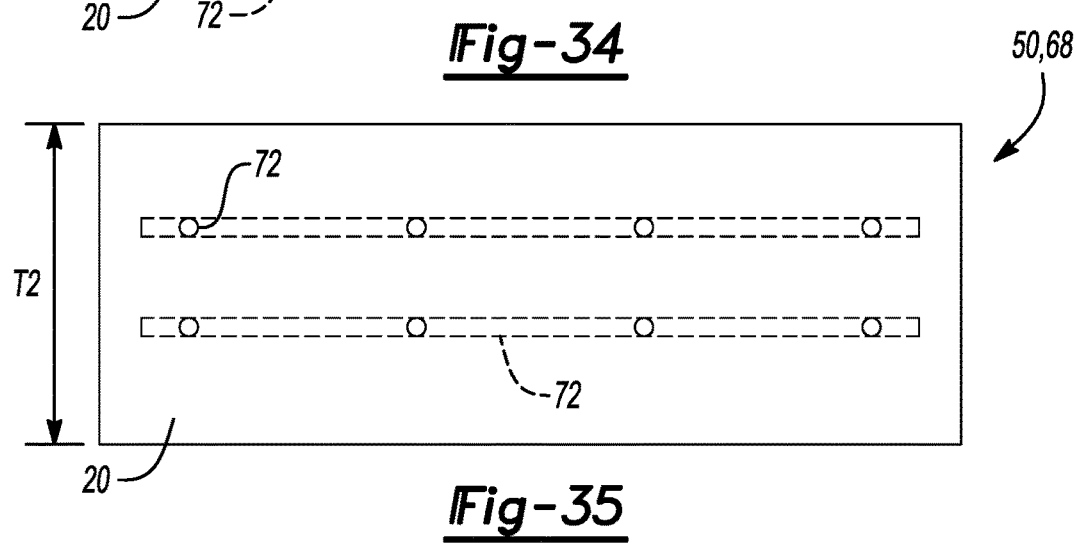
FIG. 35 is a schematic illustration of a cross-sectional view of section A-A of a ballistic test slab such as the slab shown in FIG. 32, having a thickness T2 and including multiple layers of reinforcing mesh distributed throughout the thickness of the slab.

As shown in FIGS. 33-35, a reinforcing member 72 was inserted into each of the test slabs 48, 68 during casting. By way of example, the reinforcing member 72 is shown as a mesh layer made of ¼ inch iron-based rod and having mesh openings approximately 6 inch square. As shown in FIG. 34, a single layer of reinforcing mesh was positioned as a reinforcing member 72 in the 3.5 inch thick slab 48 during casting such that the edges of the mesh layer were located approximately 3 inches from the sides of the casting form 70 and approximately halfway through the thickness of the slab 48. As shown in FIG. 35, two layers of reinforcing mesh were positioned as reinforcing members 72 in the 9.25 inch thick slab 68 during casting such that the edges of the mesh layer were located approximately 3 inches from the sides of the casting form 70 and approximately one-third and two-thirds through the thickness of the slab 48.

Graphs 38 and 40 show the penetration depth of a .50-caliber round into the ballistically tested slab 68, the slab having a thickness of about 9.25 inches, after the first bullet has been shot into the slab ($1^{st}$ shot) and after the second and third bullets have been shot into the target defined by the $1^{st}$ shot (3rd shot), with graph 38 (FIG. 5) illustrating the observed relationship between penetration depth and compressive strength of the tested slab 68, and graph 40 (FIG. 6) illustrating the observed relationship between penetration depth and iron (Fe) content by percent weight of the mixture 20 from which the tested slab 68 was made. In additional to the testing summarized in FIGS. 5 and 6, ballistic testing was performed on a test slab 48 made of mixture B2 and having a thickness of 3.5 inches. Photographic images excerpted from video recording taken of ballistic testing of the 3.5-inch slab 48, made of mixture B2, are shown in FIGS. 36-40. Photographic images excerpted from video recording taken of ballistic testing of test slabs 68 having a thickness of about 9.25 inches are shown in FIGS. 46-52 for a test slab 68 made of mixture B1, in FIGS. 41-45 for a test slab 68 made of mixture B2, and in FIGS. 53-54 for a test slab 68 made of mixture B3.

Figure 36:
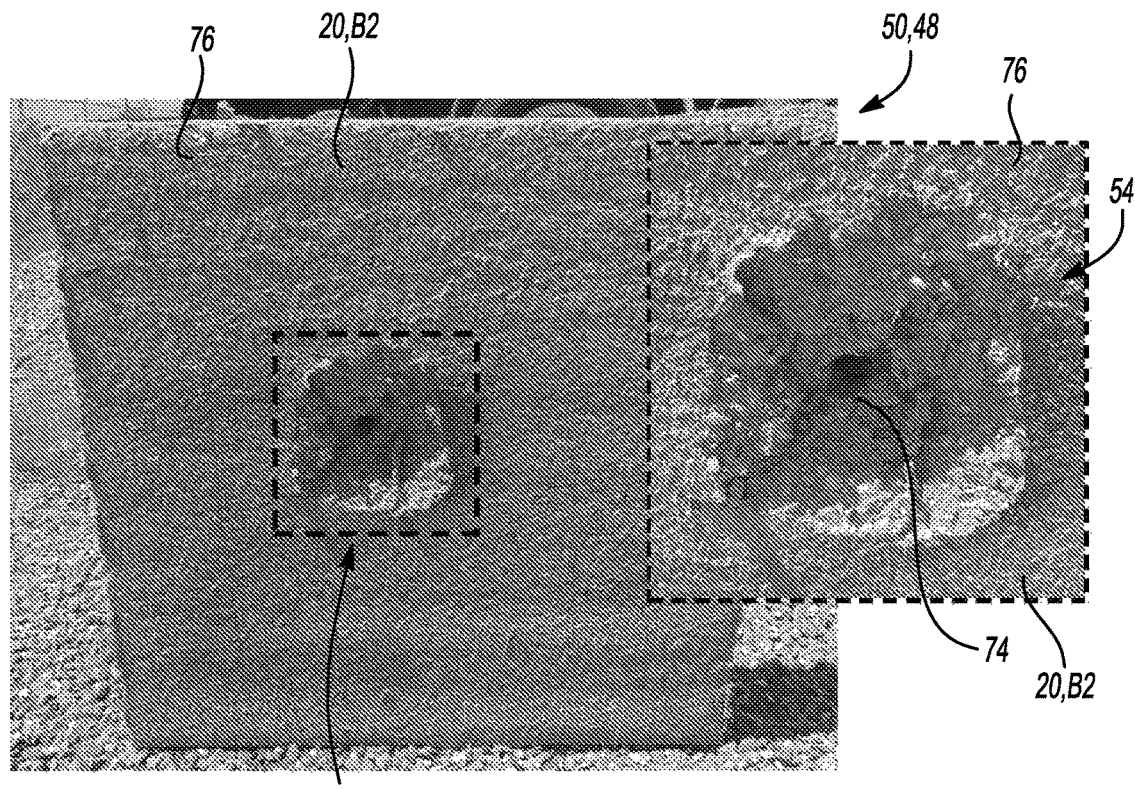
FIG. 36 is a photographic image and magnified portion thereof of a front view of a ballistic test slab made of mixture B2, as described in the table shown in FIG. 1 and continuing in FIGS. 1A and 2, the ballistic test slab having a thickness of 3½ inches, shown after impact by a .50-caliber full metal casing bullet (projectile), and after removing loose debris from the impact crater, and removing the slab from the casting form after impact.
Figure 37:
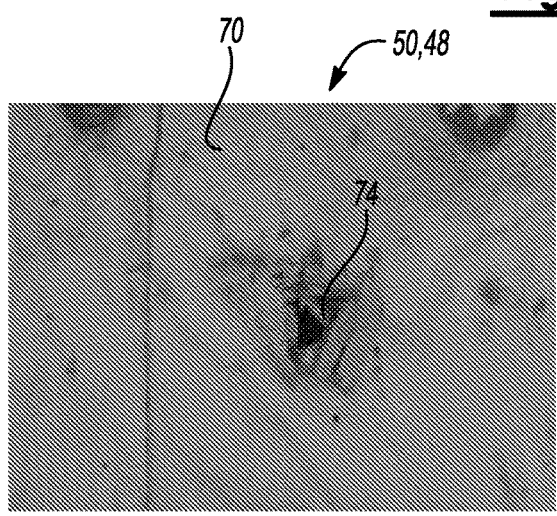
FIG. 37 is a photographic image of a portion of the casting form of the ballistic test slab of FIG. 36, showing perforation of the projectile through the base board of the slab casting form.
Figure 38:
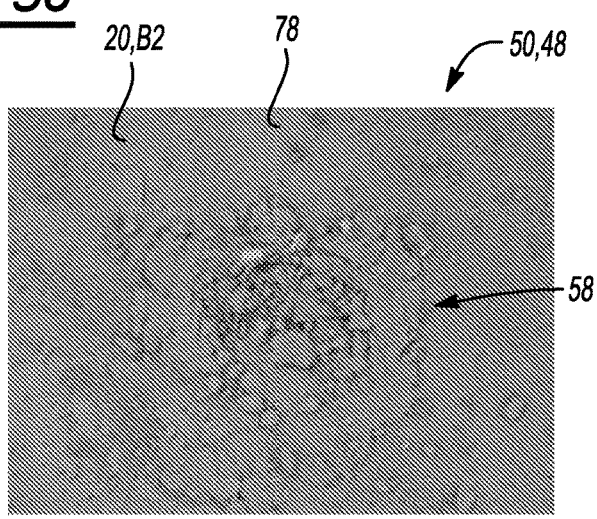
FIG. 38 is a photographic image of a rear view of the portion of the ballistic test slab shown in FIG. 36, showing a scab surrounding the perforation, immediately after removal of the slab from the casting form.
Figure 39:
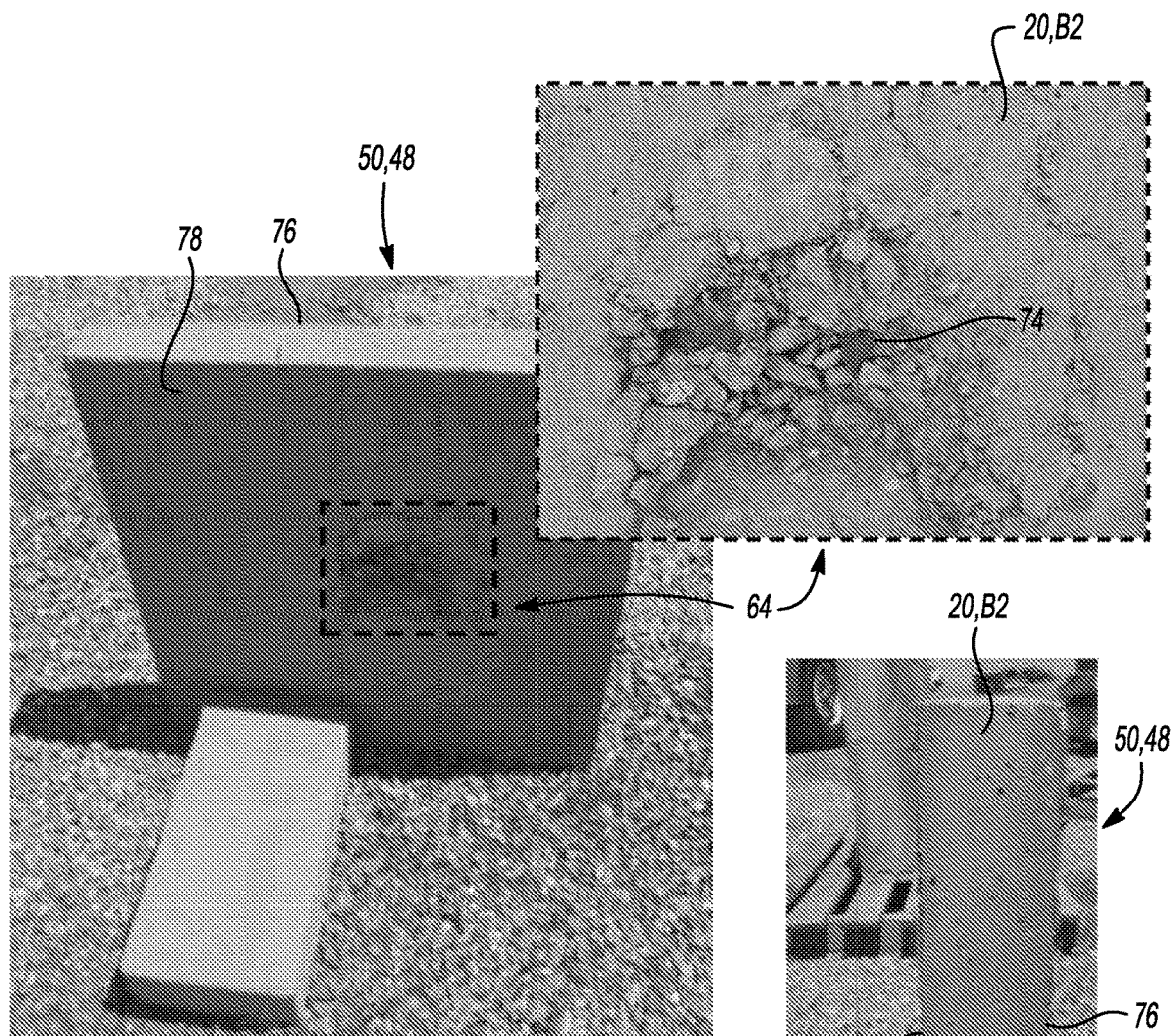
FIG. 39 is a photographic image and magnified portion thereof of the rear view of the ballistic test slab of FIG. 36 after removal of the slab from the casting form and showing the scab crater.
Figure 40:
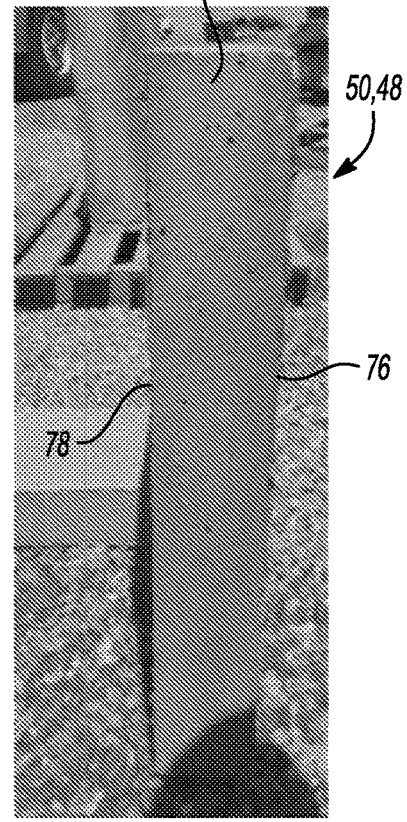
FIG. 40 is a photographic image of a side view of the ballistic test slab shown in FIG. 36.
Figure 41:
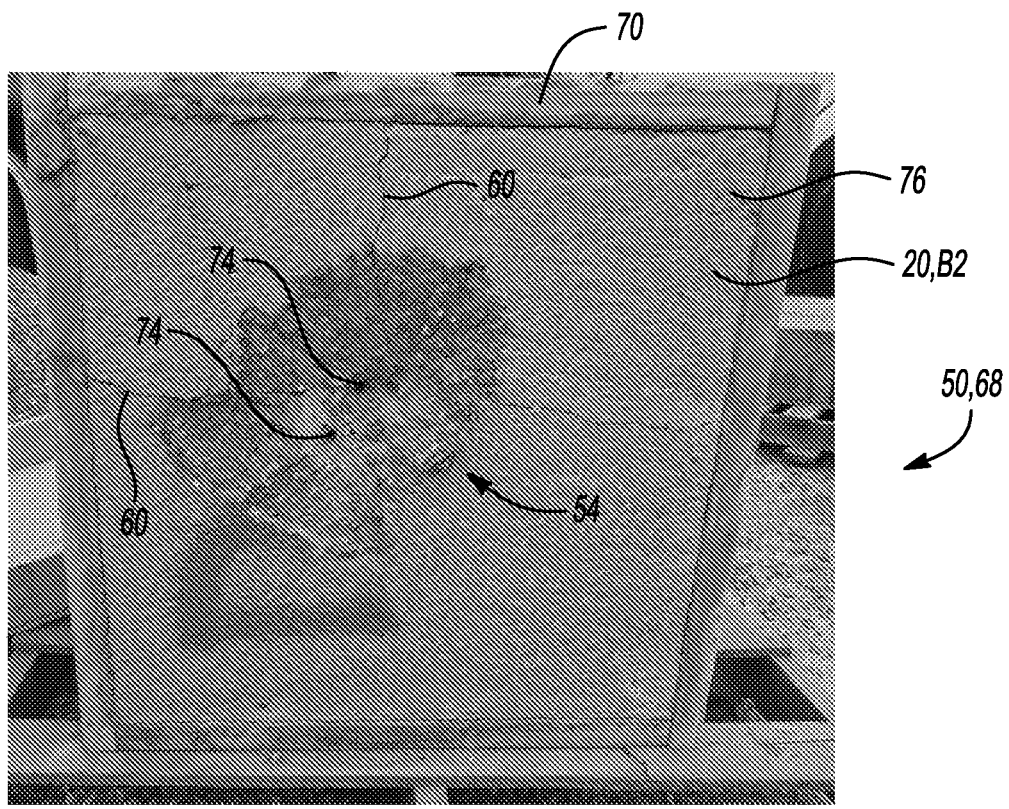
FIG. 41 is a photographic image of a front view of a ballistic test slab made of mixture B2 and having a thickness of 9¼ inches, shown after being shot with three (3) a .50-caliber full metal casing bullets (projectiles), and prior to removal of the slab from the casting form.
Figure 42:
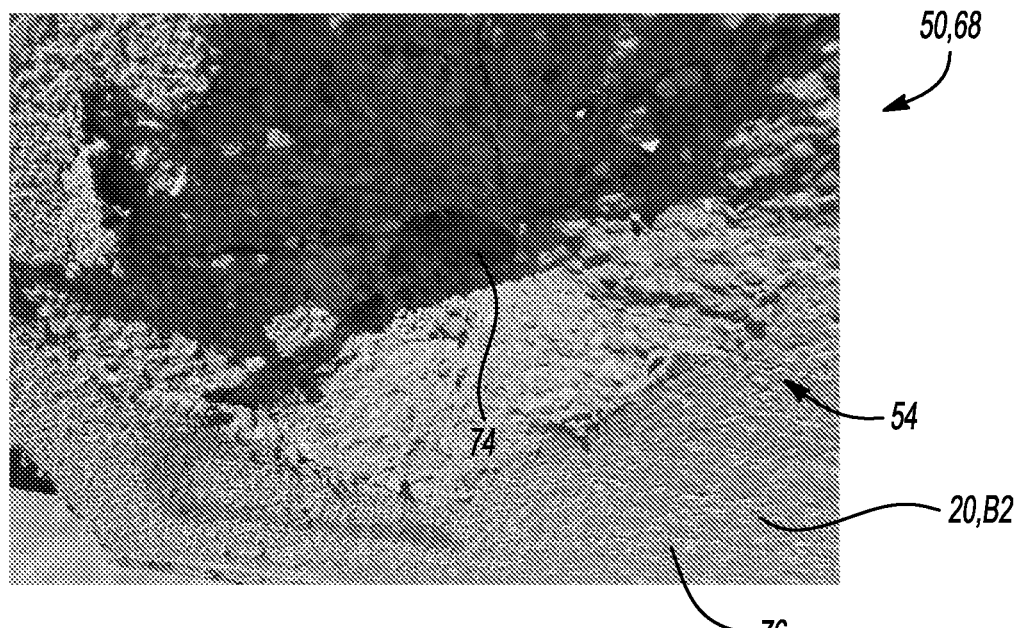
FIG. 42 is a photographic image of a perspective front view the impact crater of the test slab of FIG. 41.

Referring now to FIGS. 36-40, shown is a 3.5-inch slab 48 made of mixture B2 which was shot with a single .50-caliber bullet while the slab 48 was contained in its casting mold 70 then demolded prior to photographing the tested slab 48. As shown in FIGS. 36-40, the single round penetrated the impact face 76 and the full 3.5 inch thickness of the slab 48, exiting the rear face 78 of the slab 48, perforating the slab 48 and the casting mold 70 (see FIG. 37) and exiting the casting mold 70. FIG. 36 shows the spall crater 54 created on impact of the impact face 76 by the bullet and surrounding the bullet hole 74. FIG. 37 shows the exit hole 74 in the wood casting mold 70 in which the slab 48 was retained during shooting, and FIG. 38 shows scabbing 58 of the rear face 78 of the slab 48 observed after removal of the test slab 48 from the wood mold 70. FIG. 39 shows the rear face 78 and scab crater 64 formed by the exiting bullet on the slab 48. Notably, and as shown in FIGS. 36-40 including a side view of the tested slab 48 shown in FIG. 40, the slab 48 remained intact with no observable cracking.

Referring now to FIGS. 41-45, shown is a 9.25-inch slab 68 made of mixture B2 which was shot three times in a 3-inch diameter circle with .50-caliber bullets while the slab 68 was contained in its casting mold 70. As shown in FIGS. 41-45 and observed and measured at time of testing, the first, second and third bullets penetrated the slab 68 to a measured penetration depth, respectively, of 2.5 inches, 4.25 inches, and 4.5 inches, such that each of the projectiles was contained in the slab 68, and none of the projectiles perforated the slab 68. The concrete spalled within the spall crater 54 to a depth of about 1⅝ inches (1.625 inches).

Figure 43:
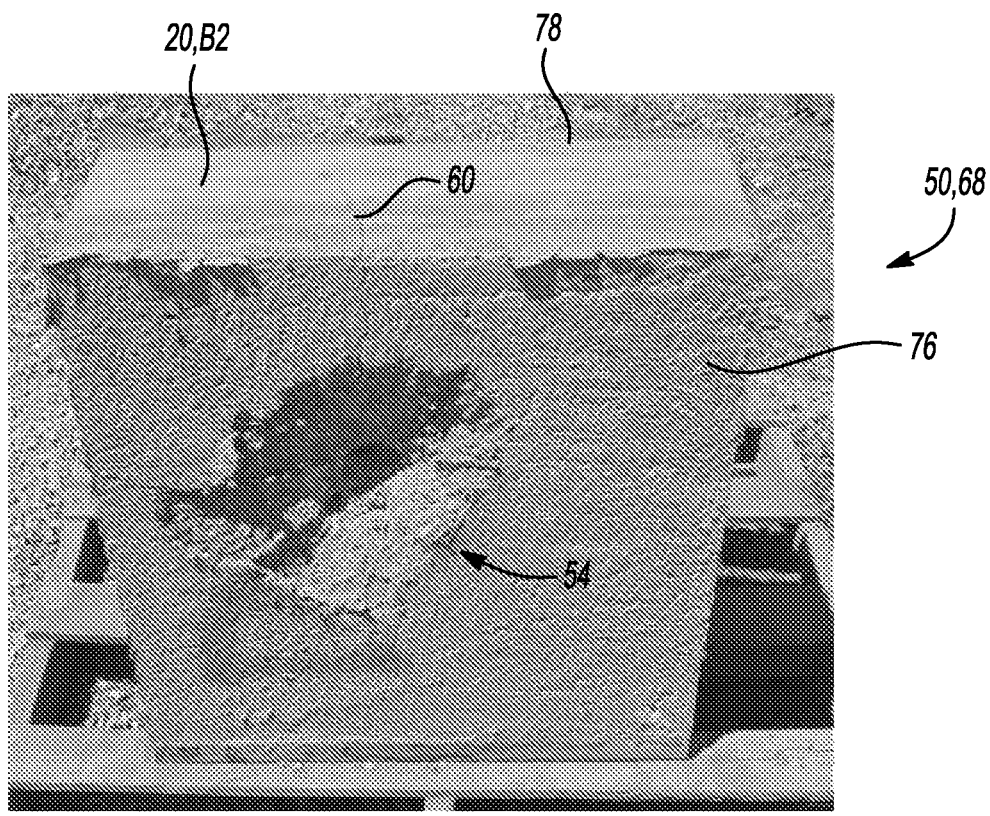
FIG. 43 is a photographic image of a perspective front view the test slab of FIG. 41 after removal of the slab from the casting form and showing cracking in the slab perpendicular to the impact face of the slab.
Figure 44:
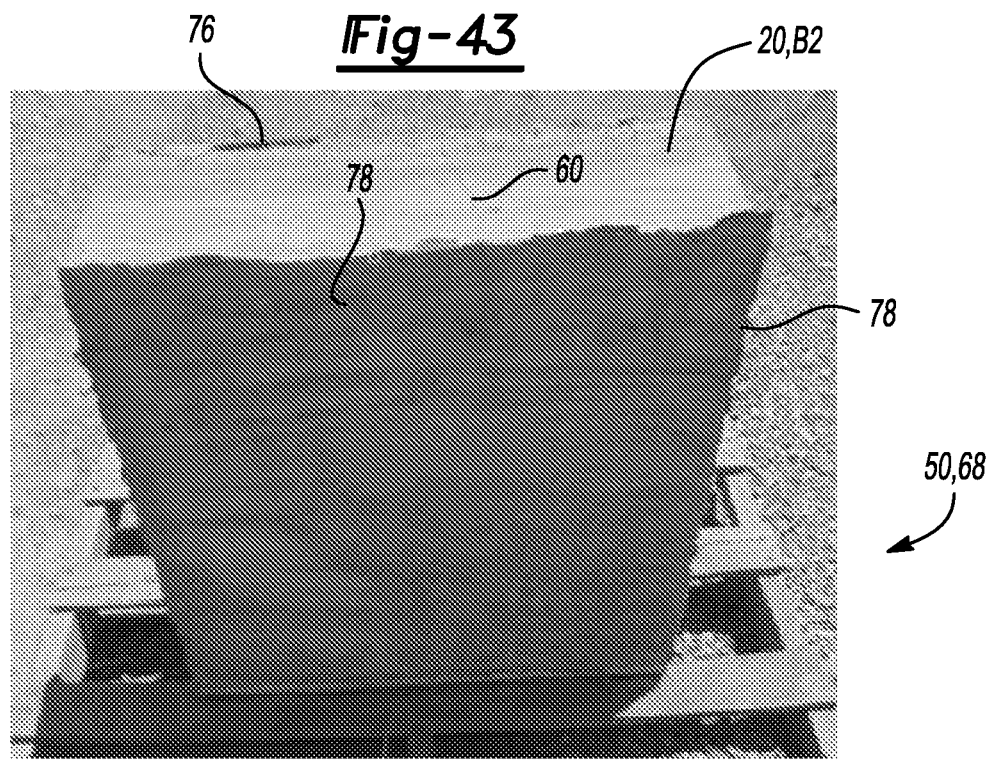
FIG. 44 is a photographic image of a perspective rear view of the test slab of FIG. 41 showing vertical and horizontal surface cracking originating from the central portion of the slab.
Figure 45:
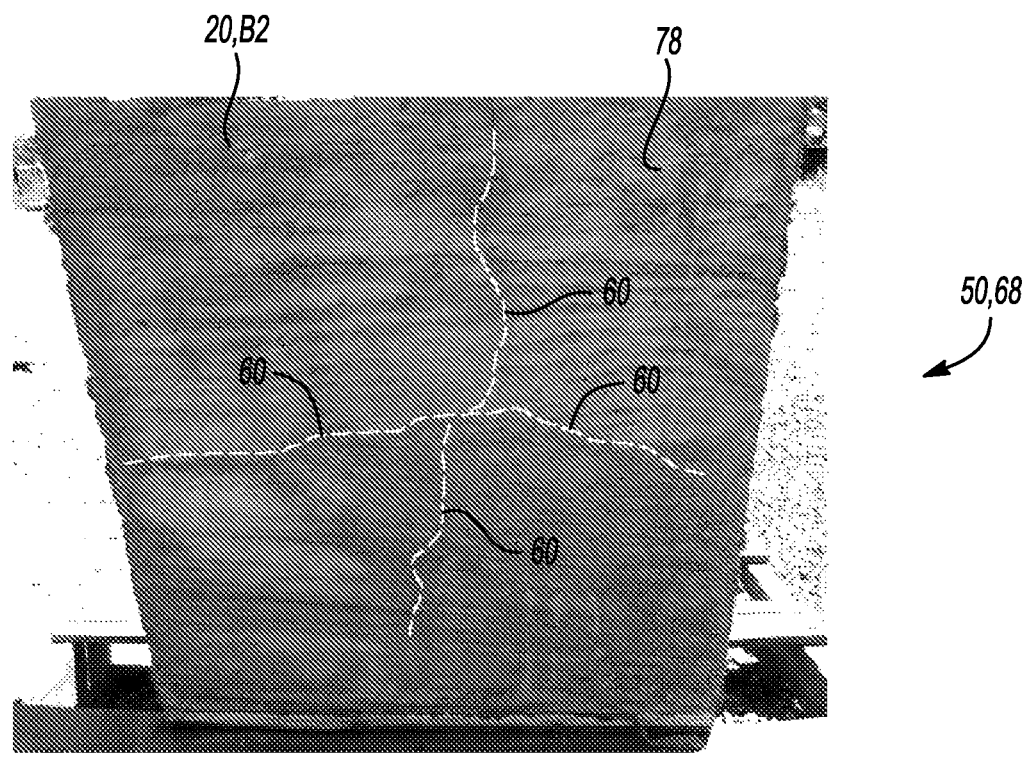
FIG. 45 is a photographic image of a perspective rear view of the test slab of FIGS. 42 and 44, the photographic image annotated to show the location of the vertical and horizontal surface cracking originating from the central portion of the slab.
Figure 46:
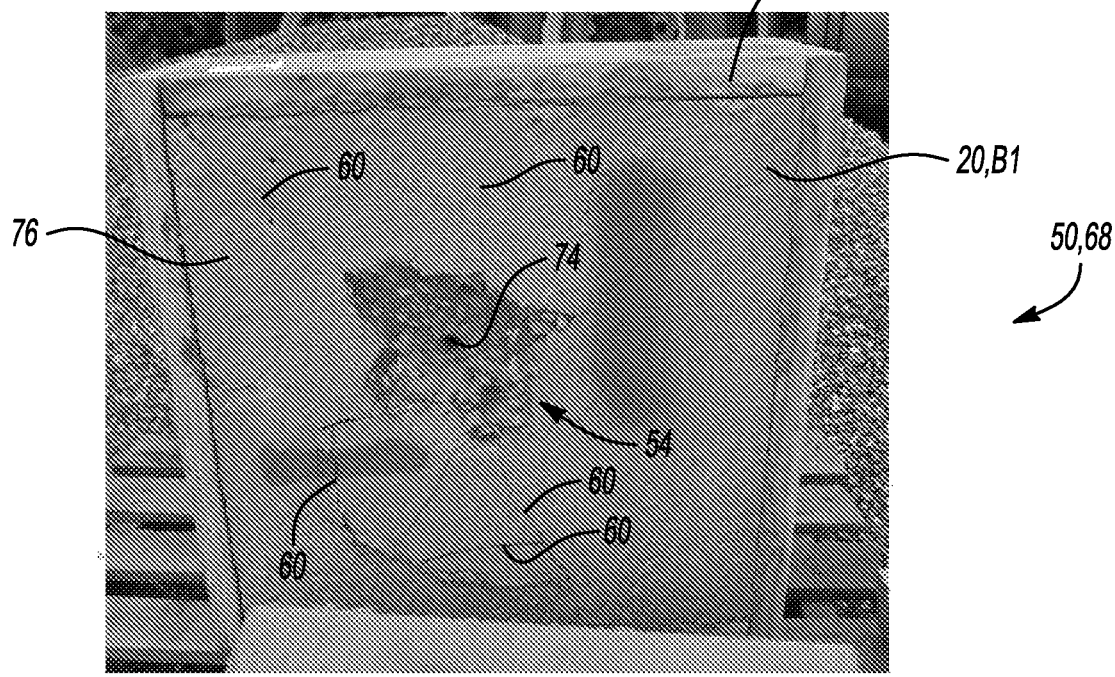
FIG. 46 is a photographic image of a front view of a ballistic test slab made of mixture B1 and having a thickness of 9¼ inches, shown after being shot with three (3) .50-caliber full metal casing bullets (projectiles), and prior to removal of the slab from the casting form.
Figure 47:
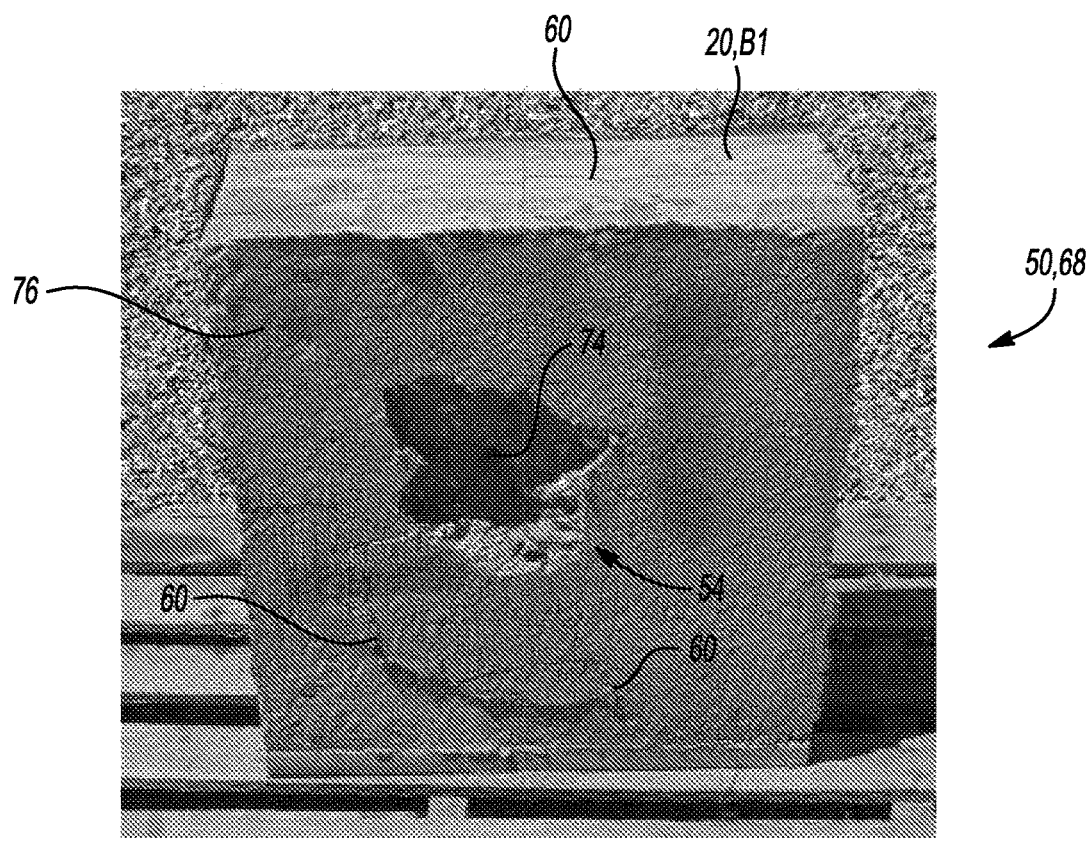
FIG. 47 is a photographic image of a perspective front view of the test slab of FIG. 46 after removal of the slab from the casting form and showing cracking in the slab perpendicular and transverse to the impact face of the slab.
Figure 48:
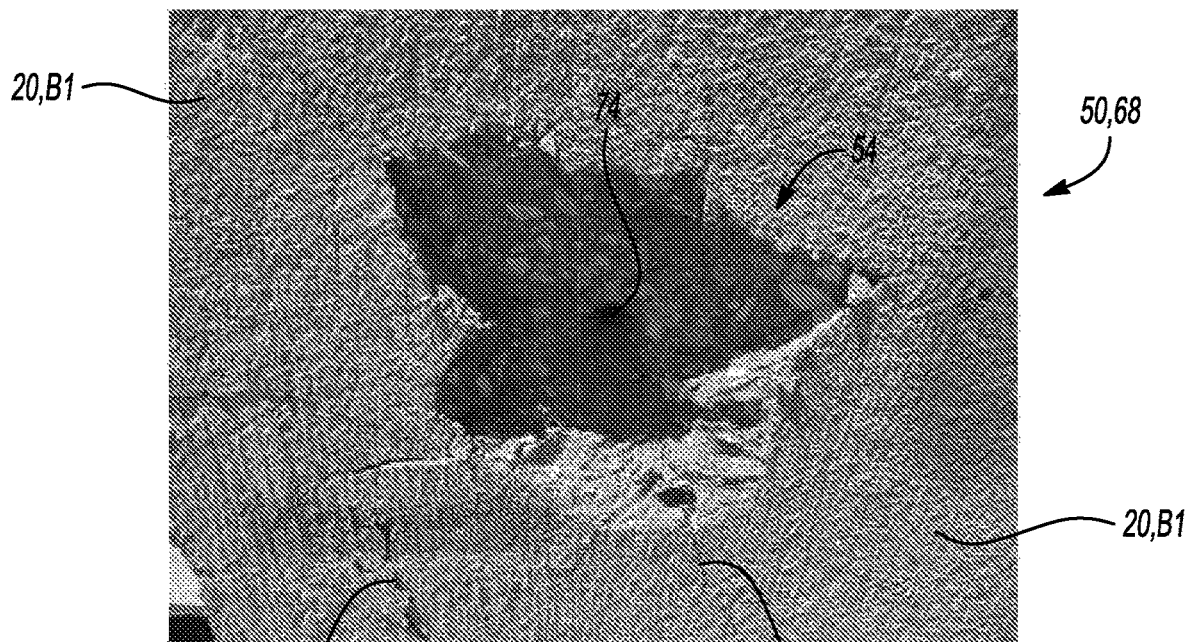
FIG. 48 is a photographic image of a perspective front view of the impact crater of the test slab of FIG. 46.
Figure 49:
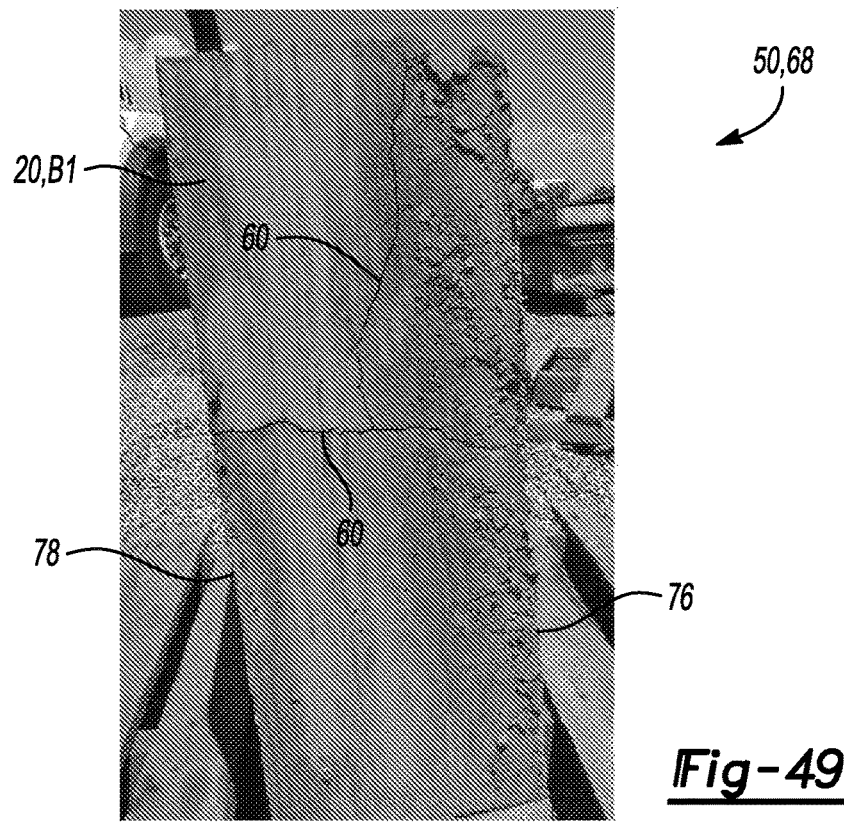
FIG. 49 is a photographic image of a perspective side view of the test slab of FIG. 46, showing cracking in the slab perpendicular and transverse to the impact face of the slab.
Figure 50:
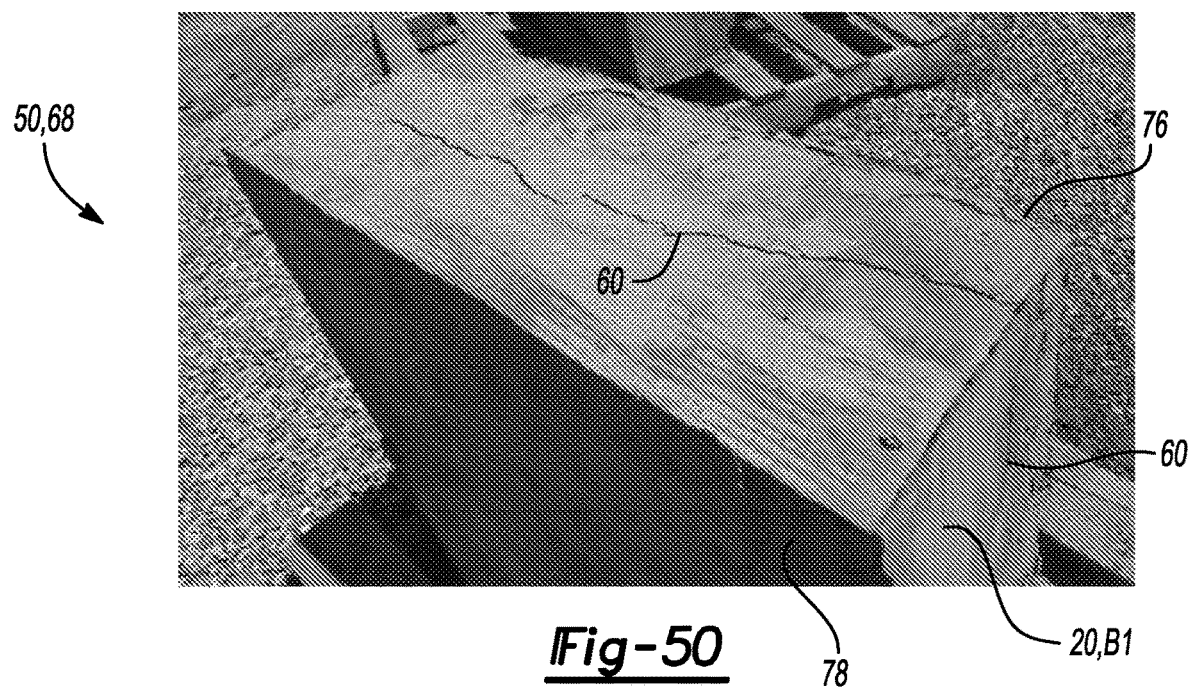
FIG. 50 is a photographic image of a perspective top, side and rear view of the test slab of FIG. 46, showing cracking in the slab transverse to the impact face of the slab.
Figure 51:
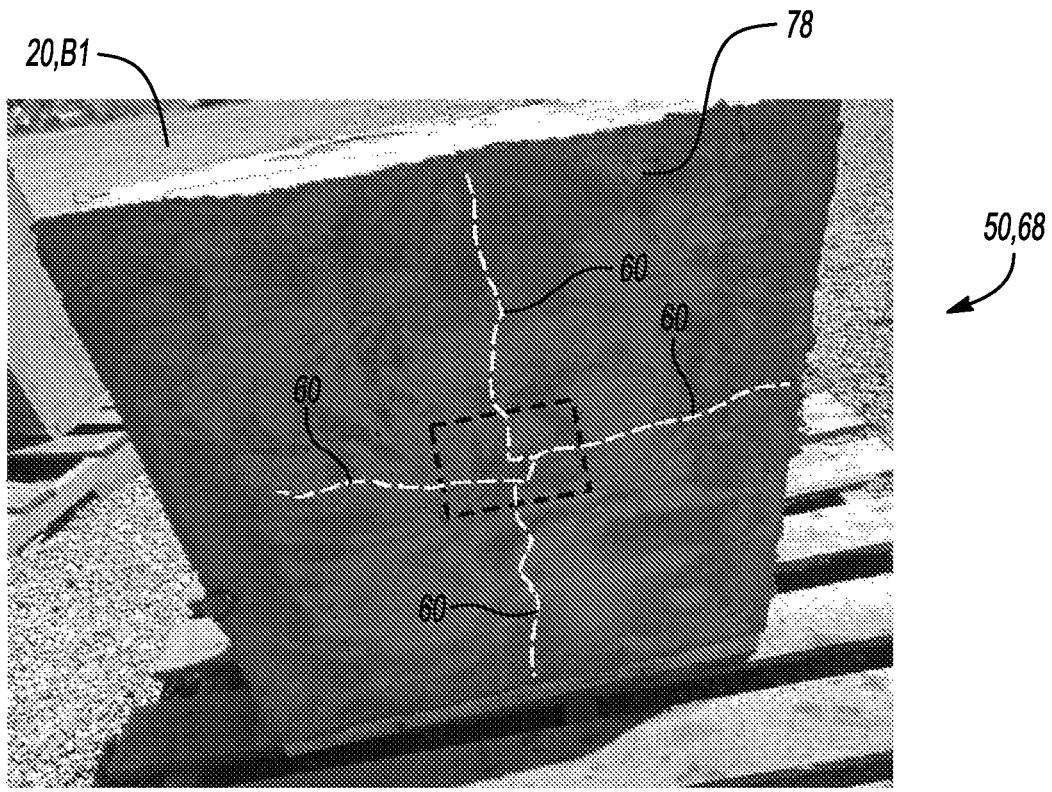
FIG. 51 is a photographic image of a perspective rear view of the test slab of FIG. 46 annotated to show vertical and horizontal surface cracking originating from the central portion of the slab.
Figure 52:
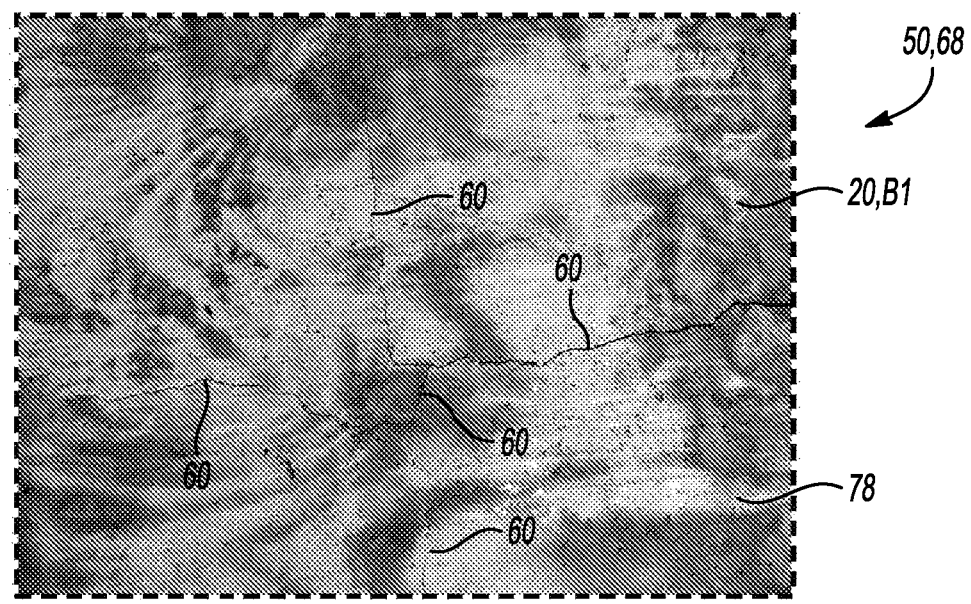
FIG. 52 is a photographic image of a rear view of the central portion of the slab of FIG. 50, showing magnified view of the vertical and horizontal surface cracking originating from the central portion of the slab.

As shown in FIGS. 43-45, cracks formed and propagated radially from the bullet hole 74 to the surfaces of the slab 68, the slab 68 remaining structurally intact. By containing the projectiles (bullets) in the slab 68, which remained intact, the slab 68 made of mixture B2 appears to have demonstrated performance under ballistic testing which meets the requirements of a Level 10 rating as identified by UL752, an Underwriters Laboratories (UL) standard, and/or the equivalent rating under National Institute of Justice (NIJ) rating criteria for ballistic resistance.

Referring now to FIGS. 46-52, shown is a 9.25-inch slab 68 made of mixture B1 which was shot three times in a 3-inch diameter circle with .50-caliber bullets while the slab 68 was contained in its casting mold 70. As shown in FIGS. 46-52 and observed and measured at time of testing, the first, second and third rounds penetrated the slab 68 to a measured penetration depth, respectively, of 2.5 inches, 4 inches, and 4 inches, which each of the projectiles contained in the slab 68. The concrete spalled within the spall crater 54 to a depth of 2 inches. As shown in FIGS. 46-52, cracks formed and propagated radially from the bullet hole 74 to the surfaces of the slab 68, and transversely through the upper portion of the slab 68 (See FIGS. 49-50), with the slab 68 remaining structurally intact. By containing the projectiles (bullets) in the slab 68, which remained intact, the slab 68 made of mixture B1 appears to have demonstrated performance under ballistic testing which meets the requirements of a Level 10 rating as identified by UL752, an Underwriters Laboratories (UL) standard, and/or the equivalent rating under National Institute of Justice (NIJ) rating criteria for ballistic resistance.

Figure 53:
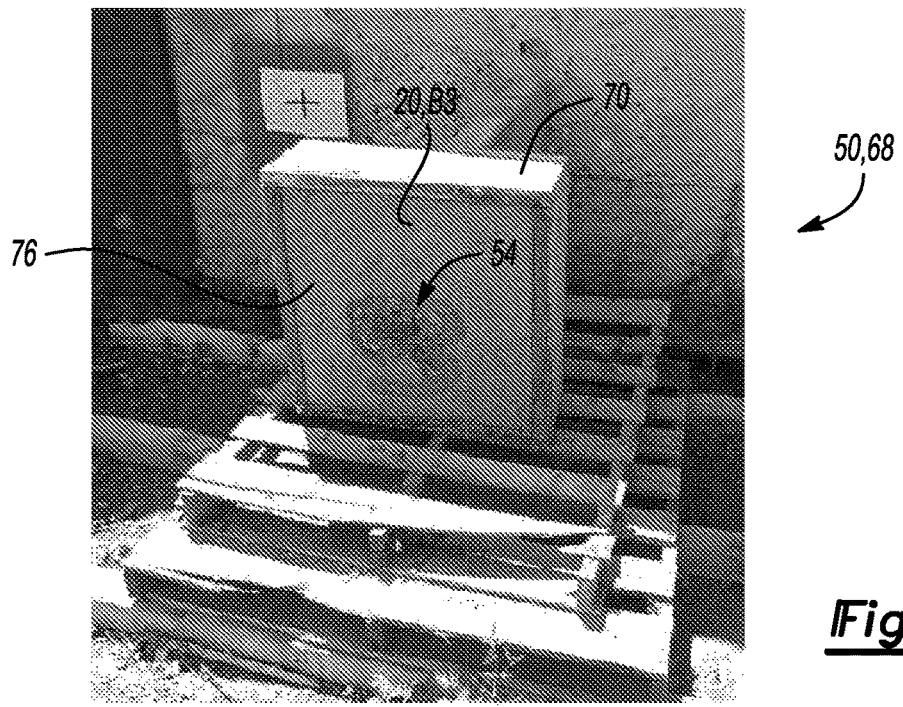
FIG. 53 is a is a photographic image of a front view of a ballistic test slab made of mixture B3 and having a thickness of 9¼ inches, shown after being shot with three (3) .50-caliber full metal casing bullets (projectiles), and prior to removal of the slab from the casting form.
Figure 54:
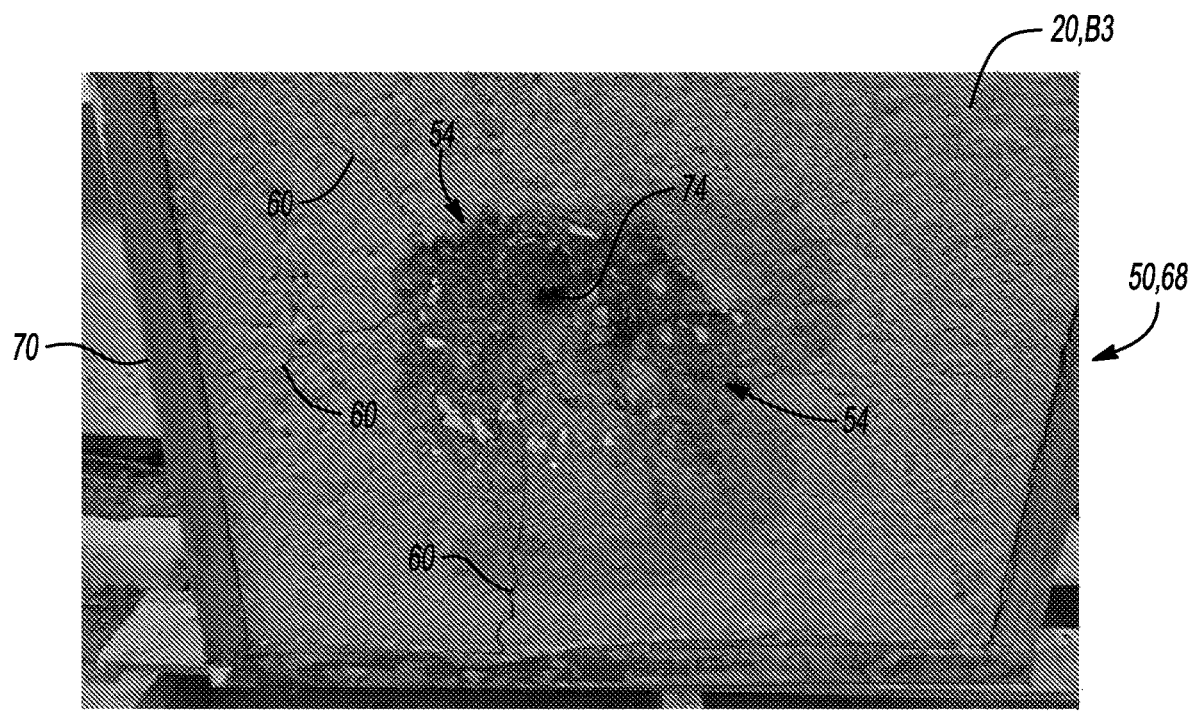
FIG. 54 is a photographic image of a perspective front view of the impact crater of the test slab of FIG. 53.

Referring now to FIGS. 53-54, shown is a 9.25-inch slab 68 made of mixture B3 which was shot three times in a 3-inch diameter circle with .50-caliber bullets while the slab 68 was contained in its casting mold 70. As shown in FIGS. 53-54 and observed and measured at time of testing, the first, second and third bullets penetrated the slab 68 to a measured penetration depth, respectively, of 3.75 inches, 5.5 inches, and 5.5 inches, which each of the projectiles contained in the slab 68. The concrete spalled within the spall crater 54 to a depth of 2.25 inches.

As shown in FIG. 54, cracks 60 formed and propagated radially from the bullet hole 74 to the surfaces of the slab 68, with the slab 68 remaining structurally intact. By containing the projectiles (bullets) in the slab 68, which remained intact, the slab 68 made of mixture B3 appears to have demonstrated performance under ballistic testing which meets the requirements of a Level 10 rating as identified by UL752, an Underwriters Laboratories (UL) standard, and/or the equivalent rating under National Institute of Justice (NIJ) rating criteria for ballistic resistance.

Referring again to FIGS. 5 and 6, graph 38 shows an inverse correlation between the compressive strength of the composite material 10 from which the respective 9.25-inch test slab 68 was formed, the penetration depth observed and measured during the ballistic testing shown in FIGS. 41-54, such that the most shallow penetration depth was observed for the mixture B1 having the relatively highest compression strength of the B1, B2 and B3 samples tested. Referring to graph 40, the type of iron particle 30 appears to influence the penetration depth, where test slabs 68 made of mixtures B1, B2 containing iron particles 26 of type IP-I made of iron rich by-product recovered from iron slag material exhibit a higher resistance to penetration than the test slab 68 made of mixture B3 containing iron particles 28 of type e.g., magnetite power. Further, the spall craters 54 of test slabs 68 made of mixtures B1, B2 were shallower than the spall crater 54 of the test slab 68 made of mixture B3, indicating the mixtures containing iron particles of type IP-I were relatively more spall resistant than the mixture containing iron particles of type IP-III.

The examples of blocks 42, slabs 48, 68 and wall sections 46 are non-limiting, and it would be appreciated that the mixtures 20 could be cast into various other shapes of structural elements 50 which can be assembled to form a structure 80. The structural elements 50 can be formed into interlocking shapes, e.g., can be formed as interlocking structural elements 82, which can be arranged into a structure 80 such that the joint interface 84 between adjacent interlocking structural elements 82 is non-planar, to increase ballistic resistance of the structure 80 by improving the resistance of the structure 80 to ballistic attack at the joint interface 84 and joints 90.

FIGS. 56-58 show illustrative examples of structures 80A, 80B, 80C, as representative of example structures 80 made of the composite mixtures 20. By way of example, composite mixtures 20 could be cast to form interlocking structural elements 82A, 82B 82C, 82D, 82E, 82F, 82G, 82H, 82J, of varying shapes, referred to individually or collectively as an interlocking structural element 82 or interlocking element 82, where a first interlocking element 82 can be positioned to interface with another interlocking element 82 to form the structure 80, where the structure 80 includes a plurality of joints 90 terminating at the opposing surfaces 86, 88 of the structure 80.

A joint interface 84 is defined between adjacent interlocking elements 82 and is bounded by the joint 90 visible at the surfaces 86, 88 of the structure 80. The joint 90 and/or the joint interface 84 defines a separation between adjacent interlocking elements 82 which may be targeted in a ballistic attack with the objective of separating the adjacent structural elements 82 at the joint interface 84. Using an illustrative example of a standard block wall (not shown) made of rectangular blocks set in horizontal layers or courses, with a mortared joint formed at the joint interface between the courses, the mortared joint and joint interface would be targeted by a projectile as the weakest area of the block wall, where a direct impact on the joint could cause separation between adjacent courses of blocks through the substantially planar joint interface and/or flexing and/or collapse of the wall.

In contrast, FIGS. 56-58 show a non-limiting example of a structure 80 formed from structural elements 50, 82 which are arranged, interfaced, nested and/or interlocked to each other in a pattern such that the joint interface 84 defined by the interfacing surfaces of each adjacent pair of structural elements 82 is non-planar, e.g., the joint interface 84 which extends between joints 90 on opposing surfaces 86, 88 of the structure 80 deviates from a joint plane 92 including the joints 90 bounding the joint interface 84, and/or, as shown in the FIGS. 56-58, any planar portion of a joint interface 84 does not extend across the full thickness of the structure 80, may intersect one, but not both, of the opposing structure surfaces 86, 88.

The interlocking structural elements 50, 82 can be made of a mixture 20 as described herein, such that the resulting structure 80 is advantaged by the ballistic resistance of the composite material 10 and the ballistic resistance of the non-planar joint interfaces 84 forming the structure 80. FIG. 56 shows an example of nested and interlocking structural elements 82A, 82B, 82C arranged such that, in the example shown, the joint interface 84, 84A formed between the interlocking structural elements 82 is non-planar to a joint plane 92, 92A including the opposing joints 90A, 90B defined by the interlocking structural elements at the opposing structure surfaces 86, 88.

FIG. 57 shows another example of nested and interlocking structural elements 82D, 82E arranged such that, in the example shown, the joint interface 84, 84B formed between the interlocking structural elements 82 is non-planar to a joint plane 92, 92B including the opposing joints 90C, 90D defined by the interlocking structural elements at the opposing structure surfaces 86, 88.

FIG. 58 shows another example of nested and interlocking structural elements 82F, 82G, 82H, 82J arranged such that, in the example shown, the joint interface 84, 84C formed between the interlocking structural elements 82 is non-planar to a joint plane 92, 92C including the opposing joints 90E, 90F defined by the interlocking structural elements at the opposing structure surfaces 86, 88, and the joint interface 84, 84D formed between the interlocking structural elements 82 is non-planar to the joint plane 92D including the opposing joints 90G, 90H defined by the interlocking structural elements at the opposing structure surfaces 86, 88.

By way of example, the interlocking structural elements 50, 82 can be coated with an elastomeric polymer coating 44, as previously described herein, to further increase the ballistic resistance of the structural elements 50, 82 and/or the structure 80, by containing spall, fragmentation, and/or debris, which may be generated by ballistic impact of the structure 80, within the coating 44 formed on the interlocking structural elements 50, 82. An elastomeric polymer coating 44 could be applied to encase the structure 80, for example, to improve ballistic resistance of the structure 80 and/or to resist displacement of the interlocking elements 82 from their arranged positions, for example, in response to a ballistic or percussive impact. A coating 44 could be applied, for example, to one or more of the structure surfaces 86, 88, for example, to increase the ballistic resistance of the joints 90, for example, by obfuscating visibility of the joints 90 and/or by providing a coating surface which bridges the adjacent interlocking elements 82 and intermediate joint 90. The coating 44 can be configured to camouflage the structure 80 or portions thereof.

Referring now to FIG. 59, shown is a method of making a structural element 50. In an illustrative example, the structural element 50 can be made of a composite material 10, e.g., formed from a composite mixture 20. The example is non-limiting, and it would be understood that the method 100 could be used to form a structural element 50 using other types of filler materials, including castable materials such as concrete-based materials, polymeric materials, etc., and/or flowable materials which can be used to fill integral molds and/or forms as described further herein, wherein flowable materials can include liquids, gases, solids including particulate solids, aggregates, etc., and/or combinations thereof, to make a structural element 50 using the method 100. In describing the method 100 herein, the terms filler material and composite mixture 20 may be used interchangeably as non-limiting examples of a molding material to form the structural element 50, which can include a composite mixture 20 or can be another type of filler material as previously described. The method 100 includes steps which may be optional depending on the configuration of the structural element 50 to be produced by the method. The ordering of the steps as shown in FIG. 59 is for illustrative purposes, and sequences and/or combination of the steps other than those described herein for illustrative purposes are anticipated within the scope of the present disclosure.

By way of illustrative example, the method 100 shown in FIG. 100 can include, at 105, forming a mold for making a structural element 50, where the mold defines an interior cavity shaped and/or configured to yield a structural element 50 in the desired shape. The mold can be, for example, a permanent reusable mold, a temporary reusable mold for forming a limited number of structural elements 50, a single use mold, or an integral mold, where the term "integral mold" as used herein indicates a mold which becomes integrally formed into and/or is otherwise incorporated into the structural element 50 being produced, for example, as a shell of or an outer layer of the structural element 50, and as such, would also be considered a single use mold. The mold can be formed of any suitable material for the forming of the structural element 50 in the desired shape and size and of the selected filler or composite mixture 20. For example, the mold can be made of a metal-based material, a polymer-based material, a metal-polymer composite, an organic material such as wood, cloth, etc., which may be configured to retain the filler or composite mixture 20 during forming of the structural element 50.

At 110, the mold may be reinforced, as described in further detail herein, as required to provide one or more of the mold shape, burst strength, stability, etc., required during the molding operation. Optionally, at 115 and/or at 130 after the filler material/composite mixture 20 is inserted into the interior mold cavity, inserts and/or reinforcing members 72 can be inserted into the mold and/or into the filler material to strengthen, shape, and/or reinforce the structural element 50. In an illustrative example, the insert may be a hollow member positioned within the composite mixture 20 to reduce the total weight of the structural element 50 while retaining the ballistic performance provided by the composite material 10 forming the structural element 50.

At 120, the filler material is prepared for insertion into the mold, and is inserted into the mold at 125. In a non-limiting example, the filler material can be a composite mixture 20 as previously described herein. In one example, more than one filler material may be inserted into the mold in layers or portions and/or in combination.

Optionally, at 135 the structural element 50 may be demolded from the mold once partially cured to a condition where structural stability and strength is sufficient to permit the demolded structural element 50 to continue curing in an unmolded condition.

At 140, curing of the structural element 50 occurs, which can be time based and/or include other treatments as required for curing of the type of filler material used to produce the structural element 50. Other treatments could include, for example, thermally treating the structural component 50 and/or controlling the water content of the filler material during curing.

The structural element is demolded at 145, unless previously demolded or molded using an integral mold. At 150, a surface treatment or combination of surface treatments can be applied to the structural element 50, including, for example, one or more of coating all or a portion of the structural element 50 with a polymeric coating 44, painting, sealing or otherwise changing the surface condition of the structural element 50, for example, to camouflage the structural element 50, create a reflective surface, etc.

At 155, the structural element 50 can be installed, positioned, and/or assembled with or joined to other elements, including other structural elements 50, to form a structure 80. At 160, a surface treatment or combination of surface treatments can be applied to the structure 80 constructed with the structural elements 50, which can include applying a polymeric coating 44, painting, sealing, mortaring, encasing, or otherwise changing the surface condition of the structure 80, for example, to obfuscate the arrangement of the structural elements 50 which can include camouflaging joints 90, camouflaging the structure, or otherwise modifying the structure for its intended use, including, in one example, adding reflective elements or coatings where visual detectability of the structure is desired, for example, in use as a traffic management device or barrier.

In another example, the method 100 includes, at 105, forming the mold as a single use or integral shell mold by spraying a polymeric material, such as a polyurea-type material, on a substrate, also referred to herein as a substrate mold, where the substrate is confined to define the shape of the structural element 50 to be produced. In one example, the substrate mold may be a permanent, semi-permanent, or temporary use casting mold defining the shape of the structural element 50 such that the shell mold is formed by coating the mold surface of the substrate mold with the polyurea material and allowing the polyurea material to cure. In one example, an insert or reinforcing member 72 can be inserted into the shell mold to reinforce, supplement, and/or shape the shell mold. The insert or reinforcing member 72 can include, by way of non-limiting example, one or more of a tape, ribbing, a fiber-based element, a metal element, a polymeric element, or a combination of these applied to the shell mold, for example, to increase the burst strength or shape retention of the shell mold, and/or one or more of a reinforcement member such as a reinforcing bar, mesh, cage, shaped insert, frame or combination of these to reinforce the shell mold and/or the structural element 50 formed in the shell mold. In another example, an insert and/or reinforcing member can be inserted 130 into the shell mold after the filler material has been inserted into the shell mold.

In one example, the filler material, which may be a composite mixture 20 as previously described herein, is prepared 120 and inserted 125 into the shell mold before removing the shell mold from the substrate mold. Subsequently, the shell mold containing the filler material is removed from the substrate mold either after the filler material has been partially cured 135 or is demolded 145 from the substrate mold after fully curing 135 the filler material. The shell mold and filler material can be removed from the substrate mold after only partially curing 135 the filler material, for example, when a composite mixture 20 which is characterized by rapid and/or early increase in strength during the curing cycle, such as mixture A1, A2, A3, B1, B6, B7, is used, and such that the substrate mold may be made available to produce another structural element 50 in less time than required to fully cure the filler material.

In another example, the shell mold is removed from the substrate mold prior to inserting reinforcing members and/or inserting the filler mixture 20 into the shell mold. In this example, the filler mixture 20 is inserted into the shell mold and cured into the composite material 10. The shell mold may be reinforced prior to inserting reinforcing members 72 and/or the filler mixture 20 and/or prior to and/or during curing of the filler mixture 20, for example, by one or more of wrapping, bracing, taping, roping or otherwise supporting the shell mold during pouring and casting. After curing, the single use shell mold can be removed from the cured structural element 50 or can be retained on the structural element 50 as an integral mold, where the material of the shell mold can be characterized as a coating 44 of the structural element 50. By way of example, a surface treatment 150 can be applied to the structural element 50 and/or to the integral mold. The surface treatment 150 can be, for example, a coating layer 44, paint, camouflaging treatment, sealant, etc., as required by the intended use of the structural element 50. In one example, a coating layer 44 or other closure element, such as a cap, lid or seal configured to be fitted and/or attached to the opening in the integral mold through which the filler mixture 20 was inserted, is applied to the structural element 50 to enclosure the opening, so as to fully enclose the filler material of the structural member 50 with the combination of the integral mold and the coating layer 44 and/or closure element.

In one example, the substrate may be a collapsible form (such as an expandable balloon form or bladder) which can be coated with the polymeric material to form an integral shell, such that after the polymeric material has cured to form the integral mold, the collapsible form can either be collapsed and removed from the integral mold, then re-expanded for use in forming another integral mold, or can remain in the integral mold as an additional layer to the structural element 50.

In one example, reinforcing members 72 can be added to the shell mold to reinforce, supplement, and/or shape the shell mold. The insert or reinforcing member 72 can include, by way of non-limiting example, one or more of a tape, ribbing, a fiber-based element, a metal element, a polymeric element, or a combination of these applied to the shell mold, for example, to increase the burst strength or shape retention of the shell mold, and/or one or more of a reinforcement member such as a reinforcing bar, mesh, cage, shaped insert, frame or combination of these applied the shell mold or inserted into the shell mold to reinforce the shell mold and/or the structural element 50 formed in the shell mold.

After curing, the shell mold can be removed from the cured structural element 50 or can be retained on the structural element 50 as an integral mold, where the material of the shell mold can be characterized as a coating 44 of the structural element 50. A closure element or additional coating mixture may be applied to enclose the shell mold so that the shell mold completely encases the structural element 50. By way of example, a surface treatment 150 can be applied to the structural element 50 and/or to the integral mold. The surface treatment 150 can be, for example, a coating layer 44, paint, camouflaging treatment, sealant, etc., as required by the intended use of the structural element 50.

In one example, collapsible, expandable, single use, and/or integral molds can be used for onsite construction of a ballistic structure, where the availability and/or use of permanent mold production is not feasible, for example, at a field location to which permanent production molds cannot be transported. In this example, collapsible molds are advantaged by being compactible into a transportable package, for expansion and/or set-up at the installation site and/or field location. In one example, integral shell molds and/or single use molds can be fabricated at the installation site or field location using expandable bladders and/or forms as described herein.

In one example, the composite mixture 20 can be prepared at the installation site using locally sourced aggregate and/or locally sourced water, such that only the cementitious component 12 and sand component 14 including iron particles 30 need be transported, where the components 12, 18 can be provided as a pre-mixed material to the field location. In one example, the cementitious and sand component 12, 14 can be provided in a transport container of sufficient size to function as a mixing container for preparing the composite mixture 20 at the field location. In one example, the transport container can be made of a watertight fiber reinforced polymer material to prevent hydration of the cementitious and sand components 12, 14 during transport, and to function as a watertight container to which water can be added to the cementitious and sand components 12, 14 to produce a cement paste and/or the composite mixture 20 at the field location. As such, the method 100 using single use and/or integral molds and composite mixture 20 is advantaged for use as a rapid deployment means of constructing, at the installation site, a ballistic structure 80 made of a composite material 10, using materials which are readily transportable, and further advantaged by the early high strength of the structure elements 50 formed in this manner, such that a ballistic structure 80 can be rapidly constructed and installed at an installation site without the delays of offsite production of the structural elements 50, transportation of the structural elements 50 after curing to the installation site, etc.

The method 100 can optionally include, at 165, reconditioning, repairing, repurposing, and/or recycling the structural element 50. In an illustrative example, structural elements 50 made of composite mixtures 20 including iron particles 30 can be used as charge stock for an iron refining process. Structural elements 50 which have been damaged, for example, due to ballistic impact, can be repaired using additional composite mixture 20 to fill spall craters 54, etc. Structural elements 50 which have been coated with a coating 44 and impacted such that the composite material 10 of the structural element has cracked or partially crumbled however the shape of the structural element 50 has been maintained by the coating 44, can be deployed for use in non-ballistic applications.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents and observations derived therefrom may be explicitly mentioned herein; however, other combinations of steps, elements, components, and constituents and observations derived therefrom are included, even though not explicitly stated.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the presently disclosed subject matter be limited to the specific values recited when defining a range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The terms "a," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A composite material comprising:
   a cementitious component;
   a sand component including iron rich particles;
   an aggregate component;
   a water component;
   wherein the cementitious component, the sand component, and the aggregate component are mixed and hydrated with the water component to form the composite material;
   wherein the sand component has an iron rich particle content of at least 60% by weight of the sand component;
   wherein the iron rich particles have an iron content of at least 60% by weight of the iron rich particles;
   wherein the composite material has an iron content greater than 17% by weight of the composite material; and
   wherein the iron rich particles are an iron rich by-product recovered from an iron slag material.

2. The composite material of claim 1, wherein the iron rich particles have a particle size distribution in a range of about −20 mesh to +60 mesh.

3. The composite material of claim 1, wherein the iron rich particles have a particle size distribution in a range of about −3/8 inch (−0.375 inch) to +60 mesh.

4. The composite material of claim 1, wherein the iron rich particles have an iron content of at least 85% by weight of the iron rich particles.

5. The composite material of claim 1, wherein the iron rich particles are greater than 190 parts by weight of the composite material, based on 100 parts by weight of the cementitious component.

6. The composite material of claim 1, characterized by a 7-day compressive strength of at least 4,500 pounds per square inch (PSI).

7. The composite material of claim 1, characterized by a 28-day compressive strength of at least 5,800 pounds per square inch (PSI).

8. The composite material of claim 1, characterized by a 28-day compressive strength of at least 7,800 pounds per square inch (PSI).

9. The composite material of claim 1, wherein the cementitious component includes ground granulated blast furnace slag (GGBFS).

10. The composite material of claim 9, wherein the ground granulated blast furnace slag (GGBFS) is about 40% by weight of the cementitious component.

11. The composite material of claim 1, further comprising:
a fiber component including polypropylene fibers;
wherein the fiber component is about 0.23 parts by weight of the composite material, based on 100 parts by weight of the cementitious component.

12. The composite material of claim 1, further comprising:
a fiber component including steel fibers;
wherein the fiber component is about 1.08 parts by weight of the composite material, based on 100 parts by weight of the cementitious component.

13. The composite material of claim 1, characterized by a ballistic resistance which meets requirements of a Level 10 rating as defined by Underwriters Laboratories (UL) standard 792.

14. A method of forming a structural element including a composite material, the method comprising:
providing a filler material comprising:
a cementitious component;
a sand component including iron rich particles;
an aggregate component;
a water component;
forming a composite material including:
mixing the cementitious component, the sand component, and the aggregate component to provide a mixture;
hydrating the mixture with the water component to form the composite material;
wherein the sand component has an iron rich particle content of at least 60% by weight of the sand component;
wherein the iron rich particles have an iron content of at least 60% by weight of the iron rich particles;
wherein the composite material has an iron content greater than 17% by weight of the composite material; and
wherein the iron rich particles are an iron rich by-product recovered from an iron slag material;
inserting the composite material into a mold cavity defined by a mold; and
curing the composite material to form a structural element.

15. The method of claim 14, wherein the mold is configured as an integral mold such that the structural element comprises the cured filler material and the integral mold.

16. The method of claim 14, further comprising:
positioning an insert in one of the mold and the filler material such that the insert is fully encapsulated by the filler material.

17. A method of forming a structural element including a composite material, the method comprising:
providing a filler material comprising:
a cementitious component;
a sand component including iron rich particles;
an aggregate component;
a water component;
forming a composite material including:
mixing the cementitious component, the sand component, and the aggregate component to provide a mixture;
hydrating the mixture with the water component to form the composite material;
wherein the sand component has an iron rich particle content of at least 60% by weight of the sand component;
wherein the iron rich particles have an iron content of at least 60% by weight of the iron rich particles; and
wherein the composite material has an iron content greater than 17% by weight of the composite material;
inserting the composite material into a mold cavity defined by a mold;
curing the composite material to form a structural element;
demolding the structural element from the mold; and
applying a polyurea-based material on a surface of the structural element, such that the polyurea-based material encapsulates the structural element and defines a coating on the surface of the structural element.

18. The method of claim 14, further comprising:
recovering the iron rich particles from an iron slag material;
wherein recovering the iron rich particles includes at least one of size-classifying, grinding, and magnetically separating the iron rich particles from the iron slag material.

* * * * *